US012794299B2

(12) United States Patent
Xiang et al.

(10) Patent No.: US 12,794,299 B2
(45) Date of Patent: Nov. 10, 2026

(54) MOTOR, STATOR, AND MANUFACTURING METHOD OF STATOR

(71) Applicant: CONTEMPORARY AMPEREX INTELLIGENCE TECHNOLOGY (SHANGHAI) LIMITED, Shanghai (CN)

(72) Inventors: Bin Xiang, Shanghai (CN); Liren Huang, Shanghai (CN); Ji Xia, Shanghai (CN); Qianlai Chen, Shanghai (CN)

(73) Assignee: CONTEMPORARY AMPEREX INTELLIGENCE TECHNOLOGY (SHANGHAI) LIMITED, Shanghai (CN)

( * ) Notice: Subject to any disclaimer, the term of this patent is extended or adjusted under 35 U.S.C. 154(b) by 136 days.

(21) Appl. No.: 18/680,199

(22) Filed: May 31, 2024

(65) Prior Publication Data

US 2024/0322630 A1 Sep. 26, 2024

Related U.S. Application Data

(63) Continuation-in-part of application No. PCT/CN2022/120033, filed on Sep. 20, 2022.

(30) Foreign Application Priority Data

Aug. 2, 2023 (CN) ......................... 202310967862.0

(51) Int. Cl.
*H02K 3/28* (2006.01)
*H02K 15/085* (2006.01)

(52) U.S. Cl.
CPC ............. *H02K 3/28* (2013.01); *H02K 15/085* (2013.01)

(58) Field of Classification Search
CPC .......... H02K 1/14; H02K 1/16; H02K 1/2798; H02K 21/24; H02K 15/0432; H02K 15/0421
See application file for complete search history.

(56) References Cited

U.S. PATENT DOCUMENTS 3,549,928 A 12/1970 Knapp
2016/0329766 A1* 11/2016 Tanaka .................. H02K 1/182
(Continued)

FOREIGN PATENT DOCUMENTS

CN 110445276 A 11/2019
CN 211629956 U 10/2020
(Continued)

OTHER PUBLICATIONS

WO-2018221449-A1 Machine Translation (Year: 2018).*
The European Patent Office (EPO) The Extended European Search Report for Application No. 22959051.8 Dec. 18, 2024 9 Pages.
The Japan Patent Office (JPO) Notice of Reasons for Refusal for Application No. 2024-128123 Oct. 14, 2025 16 Pages (including translation).
(Continued)

*Primary Examiner* — Oluseye Iwarere
*Assistant Examiner* — Masoud Vaziri
(74) *Attorney, Agent, or Firm* — ANOVA LAW GROUP, PLLC

(57) ABSTRACT

A stator includes a stator core and a stator winding. The stator core has a plurality of winding slots formed at an end surface of the stator core in an axial direction of the stator core and arranged at intervals in a circumferential direction of the stator core, and each of the plurality of winding slots extends through an inner wall and an outer wall of the stator core. The stator winding includes at least one coil unit, and each of the at least coil unit includes a plurality of first conductors assembled together. Each of the plurality of first conductors includes at least one insertion portion inserted into a corresponding one of the plurality of winding slots. The coil unit is formed by assembling and connecting the plurality of first conductors.

21 Claims, 29 Drawing Sheets

(56) References Cited

U.S. PATENT DOCUMENTS

| | | | | |
|---|---|---|---|---|
| 2021/0143700 | A1* | 5/2021 | Yao | H02K 1/182 |
| 2023/0051080 | A1 | 2/2023 | Huang | |
| 2023/0378856 | A1* | 11/2023 | Witt | H02K 15/026 |

FOREIGN PATENT DOCUMENTS

| | | | | |
|---|---|---|---|---|
| CN | 112803691 | A | 5/2021 | |
| CN | 218569963 | U | 3/2023 | |
| DE | 102021124994 | A1 | 4/2022 | |
| DE | 102021101925 | A1 | 7/2022 | |
| GB | 2358523 | A | 7/2001 | |
| JP | S5627890 | U | 3/1981 | |
| JP | 2010284001 | A | 12/2010 | |
| JP | 2011103755 | A | 5/2011 | |
| JP | 2011239653 | A | 11/2011 | |
| JP | 2015133854 | A | 7/2015 | |
| JP | 2015173561 | A | 10/2015 | |
| JP | 2016005350 | A | 1/2016 | |
| JP | 2017099149 | A | 6/2017 | |
| JP | 2018121396 | A | 8/2018 | |
| JP | 2025528996 | A | 9/2025 | |
| WO | 0147089 | A2 | 6/2001 | |
| WO | WO-2018221449 | A1 * | 12/2018 | H02K 1/16 |
| WO | 2021143121 | A1 | 7/2021 | |
| WO | 2024060039 | A1 | 3/2024 | |

OTHER PUBLICATIONS

The European Patent Office (EPO) The Extended European Search Report for Application No. 24172880.7, Nov. 14, 2024 13 Pages.

The European Patent Office (EPO) Communication pursuant to Article 94(3) EPC for 22959051.8, Oct. 9, 2025 8 Pages (including translation).

The Japan Patent Office (JPO) Decision to Grant a Patent for Application No. 2024-128123 Apirl 14, 2026 5 Pages(including translation).

The Japan Patent Office (JPO) Notification of Reasons for Refusal for Application No. 2024-568314 Oct. 21, 2025 20 Pages(including translation).

The World Intellectual Property Organization (WIPO) International Search Report and Written Opinion for PCT/CN2022/120033 May 23, 2023 14 Pages (including translation).

The Japan Patent Office (JPO) Decision to Grant a Patent for Application No. 2024-568314 Apr. 28, 2026 5 Pages(including translation).

The First Office Action for Application No. 202310967862.0, Aug. 29, 2026, China National Intellectual Property Administration (CNIPA). 20 pages (including translation).

European Patent Office, Notice of Intention to Grant for Application No. 22959051.8, Jun. 5, 2026, 9 pages.

* cited by examiner

MOTOR, STATOR, AND MANUFACTURING METHOD OF STATOR

CROSS-REFERENCE TO RELATED APPLICATIONS

The present application is a Continuation-in-Part of International Patent Application No. PCT/CN2022/120033, filed on Sep. 20, 2022, and entitled "MOTOR, STATOR, AND MANUFACTURING METHOD OF STATOR," and claims priority to Chinese Application No. 202310967862.0, filed on Aug. 2, 2023, the entire contents of both of which are incorporated herein by reference.

FIELD

The present disclosure relates to the field of power devices, and more particularly, to a motor, a stator, and a manufacturing method of the stator.

BACKGROUND

Motors have become an important measure to facilitate lightweighting of vehicles, increase recharge mileages of electric vehicles, improve space utilization of the vehicles, and reduce costs of power assemblies.

How to simplify a structure of the motor and to improve an assembly efficiency of the motor is an important research direction in the field of motors.

SUMMARY

The present disclosure provides a motor, a stator, and a manufacturing method of the stator, which can simplify a structure of the motor and improve an assembly efficiency of the motor. In a first aspect, embodiments of the present disclosure provide a stator of a motor. The stator includes a stator core and a stator winding. The stator core has a plurality of winding slots formed at an end surface of the stator core in an axial direction of the stator core and arranged at intervals in a circumferential direction of the stator core. Each of the plurality of winding slots extends through an inner wall and an outer wall of the stator core. The stator winding includes at least one coil unit, and each of the at least coil unit includes a plurality of first conductors assembled together. Each of the plurality of first conductors includes at least one insertion portion inserted into a corresponding one of the plurality of winding slots.

In the above technical solution, the coil unit is formed by assembling and connecting the plurality of first conductors. Therefore, when mounting the stator winding at the stator core, the plurality of first conductors may be connected to each other in advance to form the coil unit, and then the coil unit is arranged at the stator core as a hole. In this way, a wire embedding process can be simplified, and batch automated production can be easily realized. Further, the structure and assembly steps of the motor can be simplified, and the assembly efficiency of the motor can be improved. The plurality of first conductors of the coil unit may be connected to each other to form a distributed winding. As a result, high efficiency in electromagnetism is achieved, space harmonics are reduced, and NVH (Noise, Vibration, and Harshness) is improved.

In some embodiments, at least two first conductors of the coil unit are offset from each other in the circumferential direction of the stator core. Each of the plurality of first conductors includes a plurality of insertion portions respectively inserted into different winding slots. The stator winding is provided with at least two insertion portions stacked together in the axial direction in each of the plurality of winding slots.

Each of the plurality of first conductors is provided with a plurality of insertion portions, and the plurality of insertion portions of the first conductor are connected together, which can reduce connection steps of the insertion portions. The plurality of insertion portions of the first conductor are inserted into different winding slots, which can improve a stability of relative positions between the first conductor and the stator core. At least two first conductors of the coil unit can be offset from and embedded in each other, thereby improving stability of relative positions among the plurality of first conductors in the coil unit.

In some embodiments, the coil unit is provided with at least two insertion portions stacked together in the axial direction in each of the plurality of winding slots.

In some embodiments, the coil unit includes a plurality of conductive branches, and each of the plurality of conductive branches includes several first conductors connected in series. Two adjacent first conductors of each of the plurality of conductive branches are connected to each other to form a connection structure. All the connection structures of the coil unit are arranged outside the outer wall.

The first conductors of the coil unit may be connected outside the outer wall, and connections of the first conductors of the coil unit inside of an inner wall is eliminated. Therefore, process difficulty can be lowered, thereby improving assembly efficiency.

In some embodiments, each of the plurality of first conductors further includes at least one connection portion. Adjacent insertion portions are connected to each other by the connection portion. The at least one connection portion is located at an inner side of the inner wall.

By arranging the connection portion at the inner side of the stator core, the connection and assembly process of the plurality of first conductors at the inner side of the stator core can be reduced, thereby lowering the process difficulty.

In some embodiments, the at least one connection portion located inside the inner wall is bent in the axial direction, to position two insertion portions connected to the bent connection portion at different layers.

By bending the connection portion, a distance between the insertion portions in the axial direction can be changed, and thus facilitating arranging the at least two insertion portions at different winding layers, thereby improving the problem of a limited space at the center of the stator core. The risk of interference of different first conductors when the insertion portions are arranged across the layers and the risk of damage to the insulation coating of the first conductors can be reduced.

In some embodiments, in the axial direction of the stator core, a maximum dimension of each of the at least one connection portion is greater than a total dimension of the two adjacent insertion portions. The connection portion may be bent by a larger dimension in the axial direction to reduce a stress concentration in the connection portion, thereby reducing a risk of damage to the connection portion.

In some embodiments, all the connection portions located inside the inner wall are arranged in the circumferential direction of the stator core, allowing the coil unit to have a more compact arrangement and reducing a risk of interference between the connection portions. The internal arrangement of the stator windings is neat, which can reduce the risk of damage to the insulation coating of the first conductor.

Therefore, an insulation reliability of the stator can be improved, and the service life of the stator can be prolonged.

In some embodiments, each of the plurality of first conductors is provided with a first pin and a second pin at two ends of the first conductor. In two adjacent first conductors of each of the plurality of conductive branches, the first pin of one of the two adjacent first conductors and the second pin of another one of the two adjacent first conductors are connected to each other to form the connection structure. By providing the first pin and the second pin, the connection between the first conductors can be easily implemented.

In some embodiments, in two adjacent first conductors of each of the plurality of conductive branches, the first pin of one of the two adjacent first conductors and the second pin of another one of the two adjacent first conductors overlap with each other in the axial direction of the stator core. The first pin and the second pin are welded to each other to form the connection structure in an overlapping region.

By allowing the first pin of one first conductor and the second pin of the other first conductor to overlap with each other in the axial direction, welding between the two first conductors can be easily implemented, and the stability of the relative position between the first pin and the second pin can be improved. Therefore, an overcurrent capability of the first pin and the second pin can be improved.

In some embodiments, all the connection structures of the coil unit are arranged at intervals in the circumferential direction of the stator core. There is a gap between adjacent connection structures. When the first pin and the second pin are welded to each other to form the connection structure, a welding distance can be increased and a mutual influence during the welding can be reduced. In addition, since the connection structures are arranged at intervals, the risk of contact short circuits of the connection structures can be reduced.

In some embodiments, the stator winding includes a plurality of coil units stacked together in the axial direction of the stator core. In two adjacent coil units of the plurality of coils units, at least one connection structure of one of the two adjacent coil units and the connection structure of another one of the two adjacent coil units are offset from each other in the circumferential direction of the stator core.

The connection structures of two adjacent coil units are arranged at intervals in the circumferential direction, which can increase the distance between the connection structures of the two coil units. On the one hand, when the first pin and the second pin are welded to each other to form the connection structure, the welding distance can be increased and mutual influence during the welding can be improved. In the embodiments of the present disclosure, the electrical clearance between the connection structures can be increased, thereby reducing the insulation requirements at the connection structure. Moreover, the process complexity can be reduced, raw materials can be saved, and the production line operation rhythm can be improved.

In some embodiments, the first pin and the second pin are formed by radially extend away from the center of the stator core. In this way, the first pin and the second pin can be easily clamped during the welding, which is suitable for mass production.

In some embodiments, the overlapped first pin and the second pin are formed by extending towards each other in the circumferential direction of the stator core. As a result, a shape of the first conductor can be simplified, and a dimension of the first conductor can be reduced, thereby reducing a height of the coil unit away from the end of the stator core. As a result, the dimension of the outer envelope of the stator can be reduced, and the weight of the first conductor can also be reduced, which facilitates the arrangement of the stator.

In some embodiments, the first conductor includes a wire and an insulation coating wrapping around the wire. An end of the insulation coating has a first opening. The wire includes the first pin, and the first pin extends out through the first opening. The first opening has a first edge close to the outer wall and a second edge away from the outer wall. In an extending direction of the first pin, a distance between the first edge and an end of the first pin is smaller than or equal to a distance between the second edge and the end of the first pin.

The first pin extends out through the first opening. In this way, the first pin can be easily connected to other first conductors, thereby reducing interference of the insulation coating with the connection between the first pin and other first conductors. In the above technical solution, the part of the insulation coating close to the outer wall has a greater length, which can improve the insulation performance between the two first conductors when another first conductor passes between the insulation coating and the outer wall.

In some embodiments, an angle between a plane where the first opening is located and a virtual plane ranges from 0° to 30°. The virtual plane is perpendicular to the extending direction of the first pin and passes through the second edge.

Defining the angle $\alpha$ to range from 0° to 30° C. an balance an area of the wire covered by the insulation coating and an exposed dimension of the first pin, thereby improving the insulation performance and facilitating the connection between the first pin and other structures.

In some embodiments, each of the plurality of first conductors further includes a first connection arm and a second connection arm. The first pin is connected to one of the two adjacent insertion portions by the first connection arm. The second pin is connected to another one of the two insertion portions by the second connection arm.

A position of the first pin may be adjusted by controlling the shape and dimension of the first connection arm, and a position of the second pin may be adjusted by controlling the shape and dimension of the second connection arm. As a result, the first pin and the second pin can be located in suitable positions.

In some embodiments, the stator winding includes a plurality of coil units stacked together in the axial direction of the stator core. In two adjacent coil units of the plurality of coil units, the first connection arm and the second connection arm of the at least one first conductor of one of the two adjacent coil units are bent away from another one of the two adjacent coil units.

By bending the first connection arm and the second connection arm of the first conductor, a spacing between the connection structures of the two coil units can be increased, thereby reducing insulation requirements at the connection structure. In addition, the process complexity can be reduced, and the insulation reliability can be improved.

In some embodiments, in the axial direction of the stator core, a minimum spacing between the connection structures of two adjacent coil units is greater than or equal to 1 mm.

In the above technical solution, the electrical clearance of the stator can be increased, thereby improving the insulation performance of the stator. Therefore, the reliability of the stator can be improved, and the service life of the stator can be prolonged.

In some embodiments, in two adjacent first conductors in the circumferential direction of the stator core, the second connection arm of one of the two adjacent first conductors passes between the second pin of another one of the two adjacent first conductors and the stator core. When the first pin and the second pin are welded to each other, the influence of a high temperature on other components of the conductor during the welding can be reduced. Meanwhile, welding operations can be easily carried out on the first pin and the second pin.

In some embodiments, a side of the second connection arm facing away from the stator core has an avoidance recess for avoiding the second pin of another first conductor.

In the above technical solution, by forming the avoidance recess at the second connection arm, an avoidance can be provided for the second pin, to avoid the second pin and the second connection arms of other first conductors from being stacked together, thereby reducing a thickness of the coil unit in the axial direction of the stator core. By providing the avoidance recess, an end height of the stator winding can be reduced. As a result, a dimension of an outer envelope of the stator is relatively small, and thus the dimension of the motor is smaller, which facilitates the arrangement of the motor. In addition, by providing the avoidance recess, an interaction force caused by a positional interference of the second pin and the second connection arm can also be improved, affecting the stability of the position of the second pin, and thus affecting the welding strength.

In some embodiments, the second connection arm is bent where the second connection arm corresponds to the avoidance recess, and is formed as a protrusion protruding towards the stator core.

By providing the protrusion corresponding to the avoidance recesses, the second connection arm can be formed with the avoidance recess and the protrusion through the bending process, thereby simplifying forming process of the second connection arm.

In some embodiments, a span between two adjacent insertion portions of at least one first conductor is equal to a pole pitch. Therefore, the winding structure of the first conductor can be simplified.

In some embodiments, the first conductor has an integral structure. In this way, the first conductor has a higher connection strength, which can prolong the service life of the first conductor.

In some embodiments, two end surfaces of the stator core in the axial direction of the stator core both have the plurality of winding slots. With this arrangement, the stator windings can be embedded at different sides of the stator core, and the same stator core can accommodate more coil units.

In some embodiments, an extending direction of the plurality of winding slots is inclined relative to the radial direction of the stator core. By using inclined winding slots, a predetermined improvement in suppression of the electromagnetic noise of the motor can be provided.

In some embodiments, a slot surface of each of the plurality of winding slots includes a bottom wall surface and two side wall surfaces connected to the bottom wall surface. The two side wall surfaces are spaced apart from each other in the circumferential direction of the stator core. The plurality of insertion portions are arranged between the two side wall surfaces. Each of the plurality of winding slots has a slot opening located at an end of the winding slot in the axial direction of the stator core, and the slot opening is opposite to the bottom wall surface in the axial direction of the stator core. A dimension of the slot opening in the circumferential direction of the stator core is H1, and a spacing between the two side wall surfaces in the circumferential direction of the stator core is H2, where $H1 \leq H2$.

In the above technical solution, a reserved space for assembling predetermined distributed windings and gaps between the conductors can be greatly reduced, allowing a copper fullness rate to reach more than 75%. Meanwhile, the wire is embedded in the axial direction, which can provide a convenient and efficient wire embedding process.

In some embodiments, each of the plurality of winding slots includes a mounting slot, and the mounting slot is formed as a recess at the side wall surface. The stator further includes a limit member inserted into the mounting slot. The limit member is configured to limit movements of the plurality of insertion portions in the axial direction of the stator core. By forming the mounting slot and the limiting member, the risk of separation of insertion portions out of the winding slots can be reduced.

In a second aspect, embodiments of the present disclosure provide a motor. The motor includes the stator according to any one of the embodiments.

In a third aspect, embodiments of the present disclosure also provide a manufacturing method of a stator. The manufacturing method includes: providing a stator core having a plurality of winding slots, the plurality of winding slots being formed at an end surface of the stator core in an axial direction of the stator core and arranged at intervals in a circumferential direction of the stator core, each of the plurality of winding slots extending through an inner wall and an outer wall of the stator core; and pressing a coil unit formed by pre-assembling a plurality of first conductors into the plurality of winding slots in the axial direction of the stator core to insert an insertion portion of each of the plurality of first conductors into a corresponding one of the plurality of winding slots.

In the above technical solution, the stator core having the plurality of winding slots is first provided, and then after assembling the plurality of first conductors into the coil unit, the pre-assembled coil units are embedded into the winding slots as a whole, which can effectively improve the assembly efficiency of the stator as compared with inserting the plurality of first conductors into the winding slots one by one.

In some embodiments, prior to pressing the coil unit formed by pre-assembling the plurality of first conductors into the plurality of winding slots in the axial direction of the stator core to insert the insertion portion of each of the plurality of first conductors into the corresponding one of the plurality of winding slots, the manufacturing method further includes: providing a conductor of a linear shape, the conductor including a wire and an insulation coating wrapping around the wire; removing the insulation coating at two ends of the conductor; and bending the conductor to form the first conductor including a plurality of insertion portions arranged at intervals.

In the above technical solution, the first conductor is formed by directly bending a conductor of a linear shape after removing the insulation coating at two ends of the conductor without performing conductor cutting and other processes in the later stage, which can reduce the complexity of the manufacturing process of the conductor and improve the manufacturing efficiency of the stator.

In some embodiments, the stator has a pole number of 2p and a pole pitch that is n winding slots. Prior to pressing the coil unit formed by pre-assembling the plurality of first conductors into the plurality of winding slots in the axial direction of the stator core to insert the insertion portion of each of the plurality of first conductors into the corresponding one of the plurality of winding slots, the manufacturing method further includes: providing $2p \cdot n$ first conductors, each of the 2p·n first conductors including a first insertion portion and a second insertion portion, and a span between the first insertion portion and the second insertion portion being n winding slots. Said pre-assembling the plurality of first conductors into the coil unit includes: providing an assembly mechanism, the assembly mechanism includes 2p×n grooves, the 2p×n grooves being evenly arranged in a circumferential direction of the assembly mechanism; stacking (2p−1)×n first conductors at the 2p×n grooves sequentially in a counterclockwise direction; and inserting remaining n first conductors into the grooves of the assembly mechanism to form a coil unit, in one of the grooves, the first insertion portion of one first conductor of the coil unit being located at a side of the second insertion portion of another first conductor of the coil unit close to a bottom wall of the groove.

In the above embodiment, the plurality of first conductors can be embedded in each other and limited by each other through braiding. Therefore, the stability of relative positions among the plurality of first conductors in the coil unit can be improved.

In some embodiments, prior to pressing the coil unit formed by pre-assembling the plurality of first conductors into the plurality of winding slots in the axial direction of the stator core to insert the insertion portion of each of the plurality of first conductors into the corresponding one of the plurality of winding slots, the manufacturing method further includes: providing m×j first conductors, each of the m×j first conductors being continuously bent and including 2×k insertion portions, where m, j, and k are positive integers; braiding m first conductors to form j sub-coil units; and assembling the j sub-coil units to form the coil unit.

In the above embodiment, by braiding the plurality of first conductors in steps, braiding difficulty can be lowered, thereby improving the assembly efficiency.

BRIEF DESCRIPTION OF THE DRAWINGS

In order to clearly illustrate technical solutions of embodiments of the present disclosure, a brief description of the accompanying drawings used in embodiments of the present disclosure is given below. Obviously, the drawings in the following descriptions are only part embodiments of the present disclosure, and for those of ordinary skill in the art, other drawings can be obtained according to these accompanying drawings without creative labor.

Figure 1:
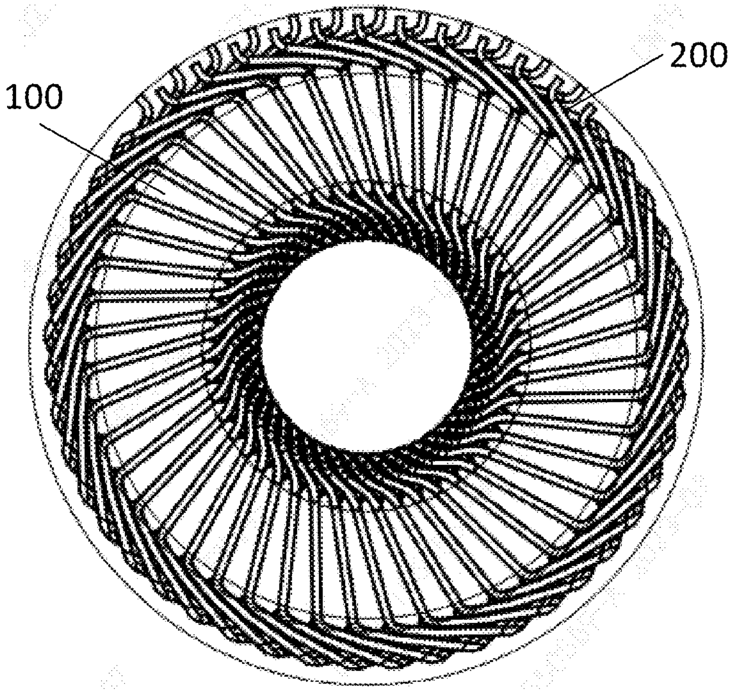
FIG. 1 is a schematic structural view of a stator according to some embodiments of the present disclosure.

In the accompanying drawings, the accompanying drawings are not to scale.

EXPLANATION OF REFERENCE NUMERALS

100, stator core; 110, end surface; 111, inner wall; 112, outer wall; 120, winding slot; 121, bottom wall surface; 122, side wall surface; 123, inclined surface; 124, slot opening; 125, mounting groove;

200, stator winding; 200*a*, coil unit; 201, conductive branch; 2011, insertion portion; 200*b*, sub-coil unit;

210, first conductor; 211, first insertion portion; 212, second insertion portion; 213, connection portion; 213*a*, first connection section; 213*b*, second connection section; 213*c*, bent section; 214, first pin; 215, second pin; 2145, connection structure; 216, first connection arm; 217, second connection arm; 217*a*, avoidance recess; 217*b*, protrusion; 218, welding protrusion; 2101, wire; 2102, insulation coating; 2103, first opening; 2104, first edge; 2105, second edge;

220, second conductor; 221, connection section;

300, limit member;

D, axial direction; L, extending direction.

DETAILED DESCRIPTION

In order to make the purpose, technical solutions, and advantages of the embodiments of the present disclosure clearer, reference will be made clearly on technical solutions in the embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those of ordinary skill in the art without creative labor are within scope of the present disclosure.

Unless otherwise defined, all technical and scientific terms used in the present disclosure have the same meanings as commonly understood by those skilled in the art of the present disclosure. The terms used in the specification of the present disclosure are only for describing specific embodiments and are not intended to limit the present disclosure. The terms "including," "having," and any variations thereof in the specification, claims, and the above description of the drawings of the present disclosure are intended to cover non-exclusive inclusion. The terms "first," "second," etc. in the specification, claims, or the above description of the drawings of the present disclosure are used to distinguish different objects, rather than to describe a specific order or a primary-secondary relationship.

Reference herein to "an embodiment" means that a particular feature, structure or characteristic described in connection with the embodiment can be included in at least one embodiment of the present disclosure. The appearances of this phrase in various places in the specification are not necessarily all referring to the same embodiment, nor are separate or alternative embodiments mutually exclusive of other embodiments.

In the description of the present disclosure, it should be noted that, unless otherwise clearly specified and limited, terms such as "install," "connect," "connect to," and "attach to" should be understood in a broad sense. For example, it may be a fixed connection or a detachable connection or connection as one piece; direct connection or indirect connection through an intermediate or internal connection between two elements. For those of ordinary skill in the art, the specific meaning of the above-mentioned terms in the present disclosure can be understood according to specific circumstances.

The term "and/or" in the present disclosure is merely an association relationship describing related objects, indicating that there may exist three relationships, for example, A and/or B, which may mean: A exists alone, A and B exist simultaneously, and B exists alone. In addition, the character "/" in the present disclosure generally indicates that the related objects are in an "or" relationship.

In the embodiments of the present disclosure, the same reference numerals represent the same components, and for the sake of simplicity, detailed descriptions of the same components in different embodiments are omitted. It should be understood that the thickness, length, width and other dimensions of various components in the embodiments of the present disclosure shown in the drawings, as well as the overall thickness, length and width of the integrated device, are only exemplary illustrations and should not constitute any limitation to the present disclosure.

The term "a plurality of" appearing in the present disclosure refers to two or more (including two).

Currently, in drive motors of new energy vehicles, it has been noticed that in a stator of a motor, the existing method mostly uses a design of centralized stator windings with inclined grooves to reduce the cogging torque. However, the inclined grooves complicate a production of a wire embedding process a stator core of the motor. The existing stator has defects such as a complex structure and wire embedding process, a low assembling efficiency. As a result, it is difficulty in achieving batch and automation production.

In view of this, embodiments of the present disclosure provide a motor, a stator, and a manufacturing method of the stator, which can simplify a structure of the stator and improve an assembly efficiency of the motor by adjusting the wire embedding and winding manners of conductors.

In order to facilitate understanding, the following explanations of the professional terms appearing in the present disclosure are provided below.

A stator refers to a stationary part in a motor, and functions to generate a rotation magnetic field.

A rotor refers to a rotational member in the motor, and functions to perform a conversion between electrical energy and mechanical energy.

A span refers to a distance spanned between two edges of one element in a motor winding on a surface of an armature, and is usually expressed by the number of winding slots formed at a stator core.

A number of magnetic pole pairs P is referred to as the number of pole pairs. The magnetic poles formed after the motor winding is energized are in the form of pairs of N pole and S pole. The total number of magnetic poles is 2P.

A pole pitch refers to a distance occupied by each of magnetic poles of the motor on a circumferential surface of an air gap. The pole pitch may be expressed by the number of the winding slots of the stator core. For example, the pole pitch is Z/2P, where Z is a total number of the winding slots of the stator core.

A pole phase group refers to a group formed by connecting in series a plurality of conductors included in a same phase winding at the same pole pitch, and is also called a coil unit. The plurality of conductors in the pole phase group each have a same current direction and same electromagnetic effects, and these conductors are formed as the magnetic poles of the phase winding.

A phase winding refers to a set of windings formed by connecting one or more parallel branches in series and parallel based on a prescribed connection method.

Figure 2:
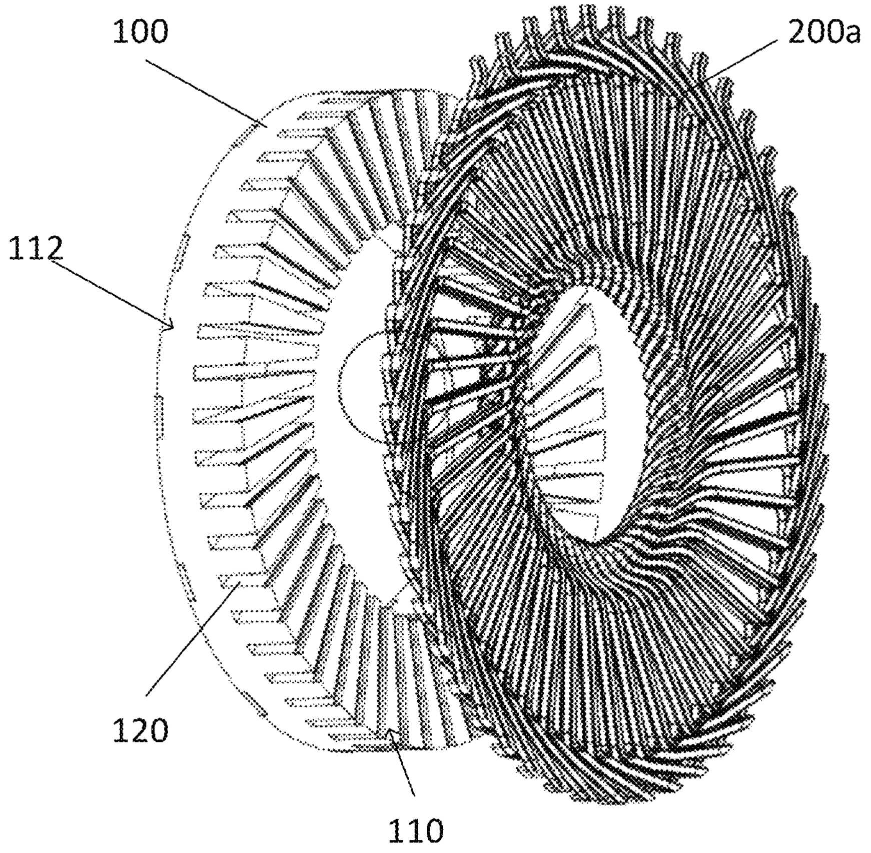
FIG. 2 is a schematic exploded view of a stator according to some embodiments of the present disclosure.
Figure 3:
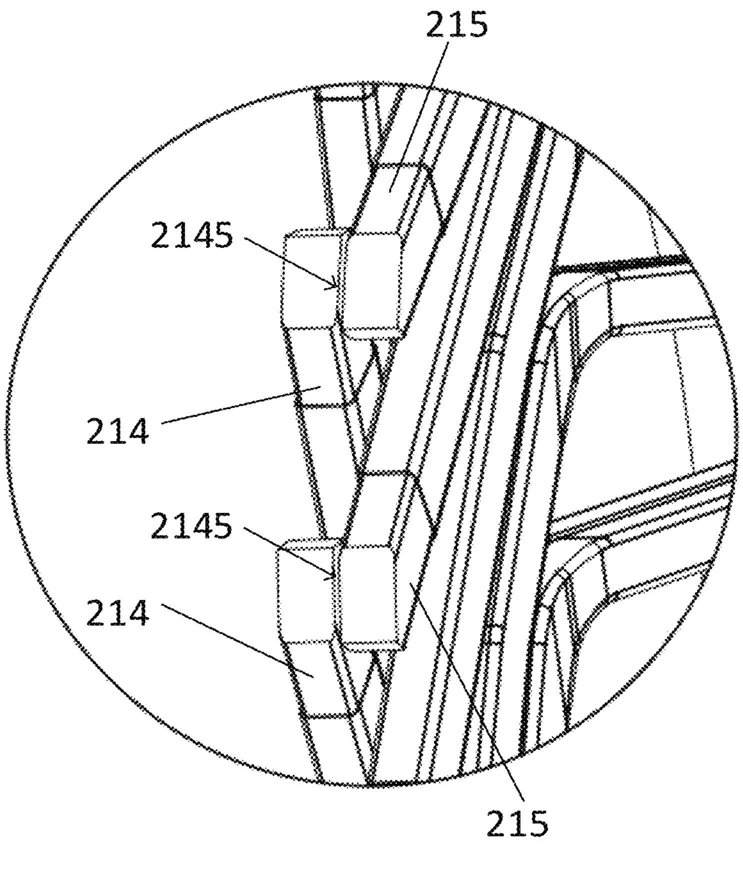
FIG. 3 is an enlarged schematic view of a circled part shown in FIG. 2.
Figure 4:
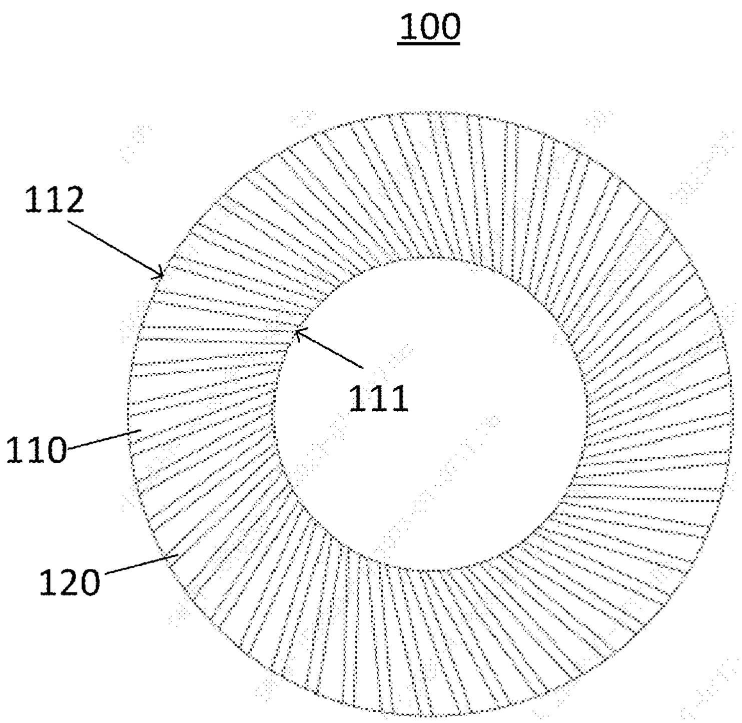
FIG. 4 is a schematic view of a stator core of a stator according to some embodiments of the present disclosure.
Figure 5:
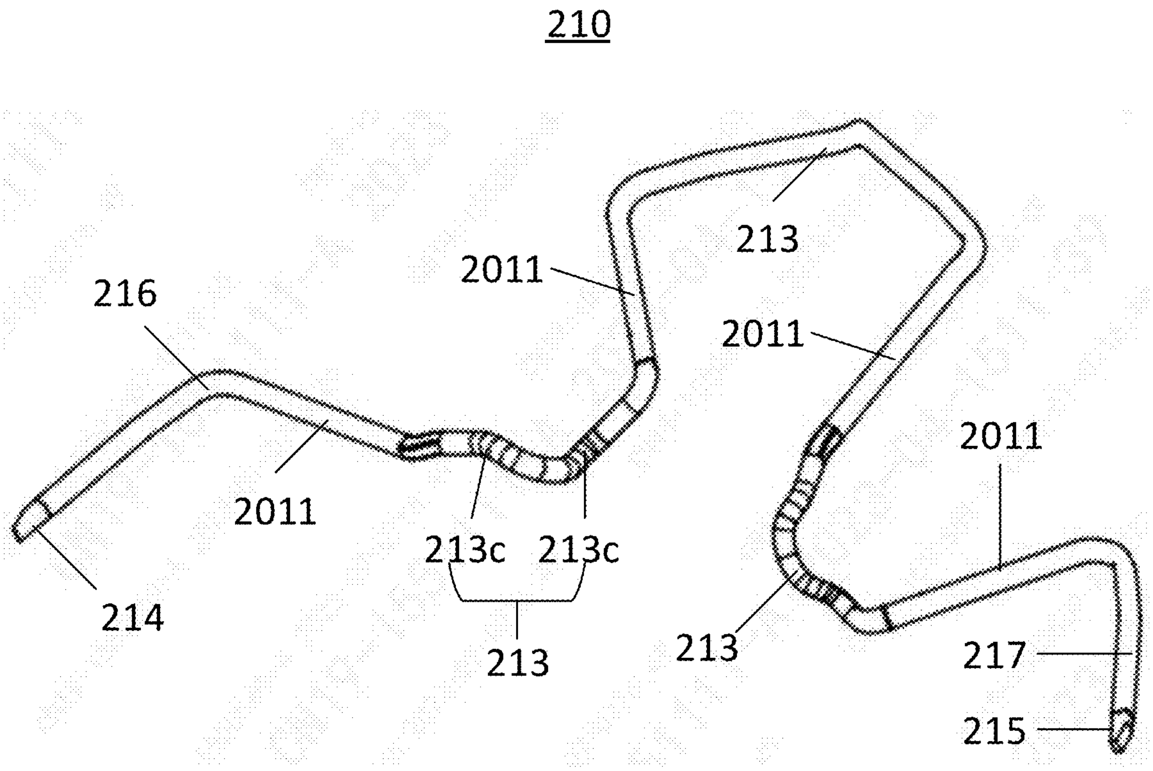
FIG. 5 is a schematic structural view of a first conductor of a stator winding of a stator according to some embodiments of the present disclosure.
Figure 6:
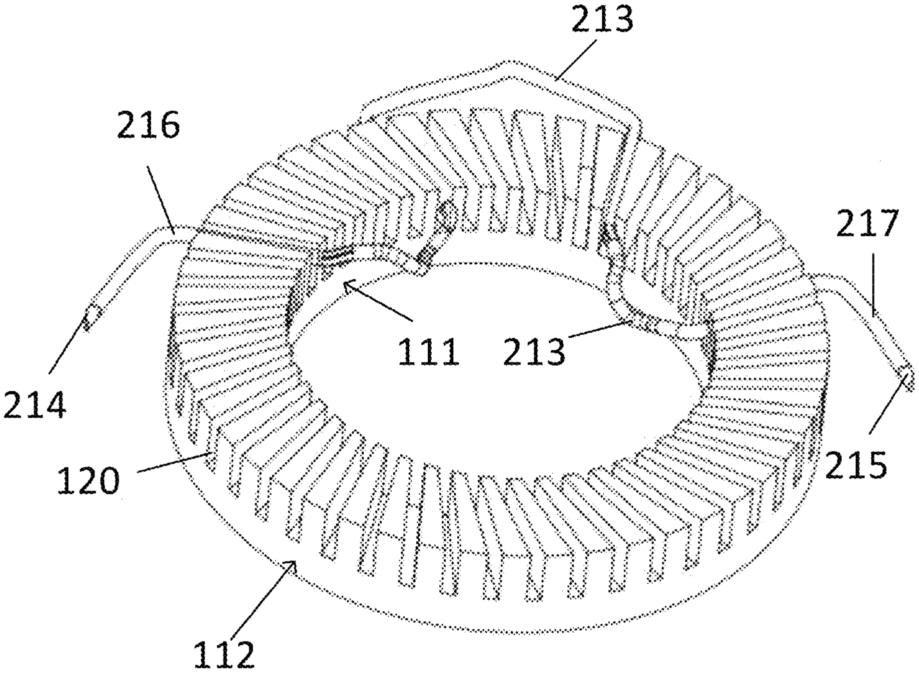
FIG. 6 is a schematic structural view of a stator core and a first conductor of a stator according to some embodiments of the present disclosure.
Figure 7:
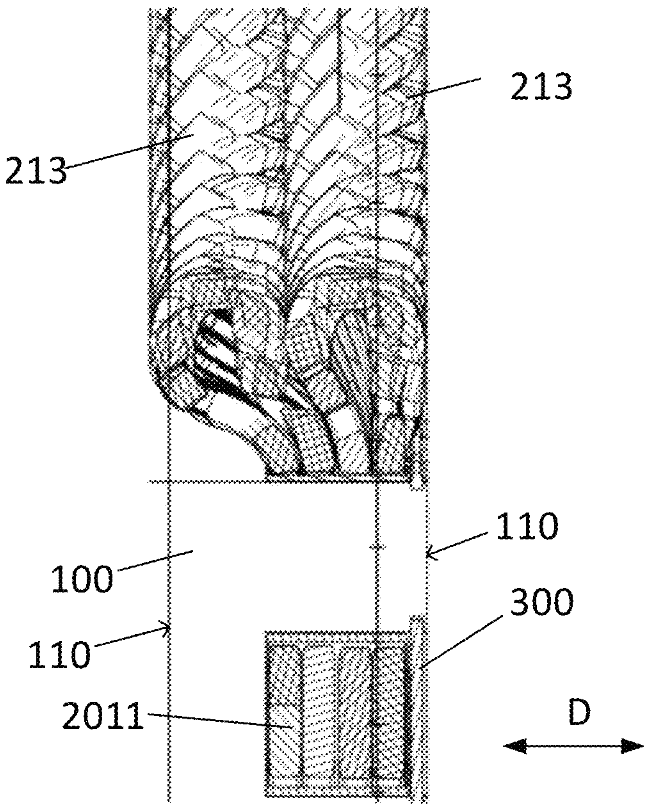
FIG. 7 is a schematic partial cross-sectional view of a stator according to some embodiments of the present disclosure.
Figure 8:
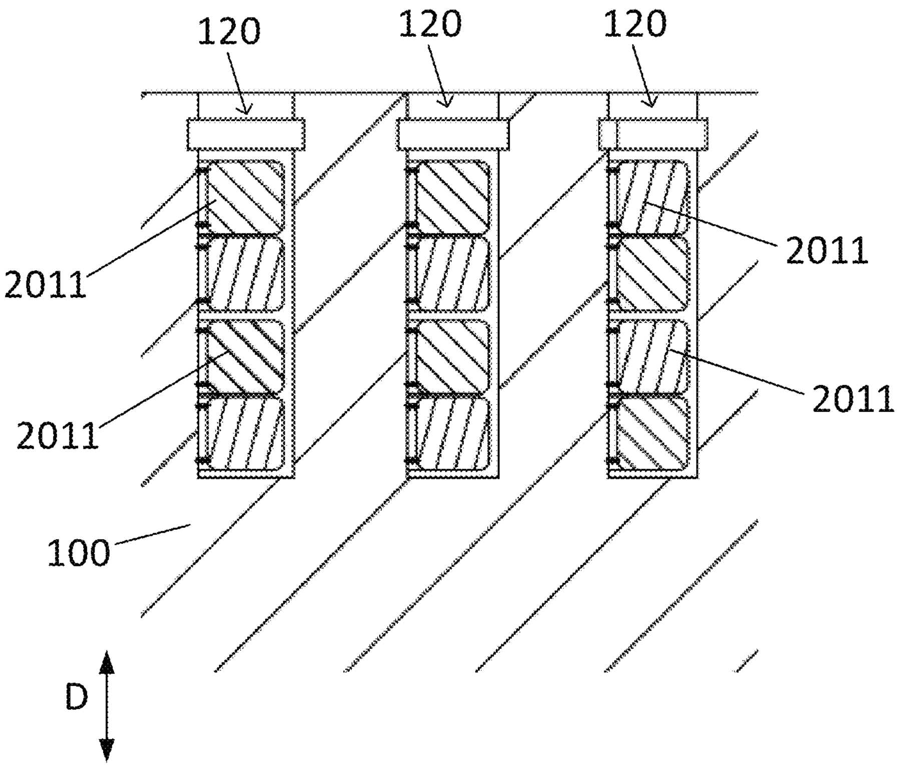
FIG. 8 is another schematic partial cross-sectional view of a stator according to some embodiments of the present disclosure.

FIG. 1 is a schematic structural view of a stator according to some embodiments of the present disclosure. FIG. 2 is a schematic exploded view of a stator according to some embodiments of the present disclosure. FIG. 3 is an enlarged schematic view of FIG. 2 at the circular frame. FIG. 4 is a schematic view of a stator corn of a stator according to some embodiments of the present disclosure. FIG. 5 is a schematic structural view of a first conductor of a stator winding of a stator according to some embodiments of the present disclosure. FIG. 6 is a schematic structural view of a stator corn and a first conductor of a stator according to some embodiments of the present disclosure. FIG. 7 is a schematic partial cross-sectional view of a stator according to some embodiments according to the present disclosure. FIG. 8 is another schematic partial cross-sectional view of a stator according to some embodiments of the present disclosure;

As shown in FIG. 1 to FIG. 8, some embodiments of the present disclosure provide a stator. The stator includes a stator core 100 and a stator winding 200. The stator core 100 has a plurality of winding slots 120 formed at an end surface 110 of the stator core 100 in an axial direction D of the stator core 100. The plurality of winding slots 120 are arranged at intervals in a circumferential direction of the stator core 100. Each of the plurality of winding slots 120 extends through an inner wall 111 and an outer wall 112 of the stator core 100. The stator winding 200 includes at least one coil unit 200*a*, and each of the at least one coil unit 200*a* includes a plurality of first conductors 210 assembled together. Each of the plurality of first conductors 210 includes at least one insertion portion 2011 inserted into a corresponding one of the plurality of winding slots 120.

The stator core 100 has two end surfaces 110 opposite to each other in the axial direction D. In the embodiments of the present disclosure, the winding slots 120 may be formed at only one end surface 110, or may be formed at two end surfaces 110.

The stator core 100 has an inner wall 111 and an outer wall 112. The two ends of the winding slots 120 have openings formed at the inner wall 111 and the outer wall 112, respectively. The inner wall 111 and the outer wall 112 refer to wall surfaces of the stator core 100. In another exemplary embodiment of the present disclosure, the inner wall 111 and the outer wall 112 are both cylindrical surfaces. The inner wall 111 and the outer wall 112 are connected to each other by the two end surfaces 110.

For example, the winding slots 120 radially extend through the stator core 100. It may be understood that the phrase "radially extending through" means that two ends of the winding slots 120 extend to the inner wall 111 and the outer wall 112. Further, the extending direction of the winding slot 120 is not required to be parallel to the radial direction.

An extending direction of the winding slot 120 may be set as desired. In some examples, the winding slot may be a straight slot extending in the radial direction of the stator core 100. In other examples, the winding slot may also be an inclined slot extending in a direction at an angle relative to the radial direction.

In the circumferential direction of the stator core 100, the plurality of winding slots 120 may be arranged at equal intervals or at unequal intervals.

The plurality of first conductors 210 of the coil unit 200*a* may be assembled together through braiding, stacking, or other processes. For example, the first conductors 210 may be fixedly connected to each other, or may be limited by each other by their own structures.

The number of the insertion portions 2011 of the first conductor 210 are not limited to the embodiments of the present disclosure. The number of the insertion portions 2011 of the plurality of first conductors 210 may be the same or different. In some examples, all of the first conductors 210 have the same number of the insertion portions 2011. For example, each of the first conductors 210 may have one, two, four, eight or more insertion portions 2011. In other examples, the number of the insertion portions 2011 of some of the first conductors 210 may be different from the number of the insertion portions 2011 of other first conductors 210. For example, some of the first conductors 210 include one insertion portion 2011, some of the first conductors 210 include two insertion portions 2011, and some of the first conductors 210 include three or more insertion portions 2011.

One or more coil units 200*a* may be provided. For example, the at least one coil unit 200*a* may include a plurality of coil units, and the plurality of coil units 200*a* may be stacked together in the axial direction D of the stator core 100.

Each of the first conductors 210 may include one or more insertion portions 2011. Each of the insertion portions 2011 is an effective edge of the first conductor 210, and is embedded in the stator core 100 to function electromagnetic pole energy conversion.

The plurality of first conductors 210 may be arranged in various ways. Each of the first conductors 210 may be a flat wire or a round wire. The flat wire may have a rectangular cross section, and the round wire may have a circular cross section. The embodiments of the present disclosure will be described by taking the flat wire as an example. In other embodiments, the first conductor 210 may also be a round wire.

In an exemplary embodiment of the present disclosure, the coil unit 200*a* is inserted into the winding slots 120 in the axial direction D. Embedding the coil unit 200*a* in the axial direction D can provide a convenient and efficient wire embedding process.

In the above technical solution, the stator includes the stator core 100 and the stator winding 200. The coil unit 200*a* of the stator winding 200 is embedded in the winding slots 120 of the stator core 100. The coil unit 200*a* is formed by assembling and connecting the plurality of first conductors 210. Therefore, when mounting the stator winding 200 at the stator core 100, the plurality of first conductors 210 may be connected to each other in advance to form the coil unit 200*a*, and then the coil unit 200*a* is arranged at the stator core 100 as a whole. In this way, a wire embedding process can be simplified, and batch automated production can be easily achieved. Further, the structure and assembly steps of the motor can be simplified, and the assembly efficiency of the motor can be improved. The plurality of first conductors 210 of the coil unit 200*a* may be connected to form a distributed winding. As a result, high efficiency in electromagnetism can be achieved, space harmonics can be reduced, and NVH (Noise, Vibration, and Harshness) can be improved.

In some embodiments, an extending direction of the plurality of winding slots 120 is inclined relative to the radial direction of the stator core 100. In the present disclosure, by using the inclined winding slots, a predetermined improvement in suppression of the electromagnetic noise of the motor can be provided.

In other embodiments, the extending direction of the winding slot 120 may also be parallel to the radial direction of the stator core 100. In this way, the convenience of manufacturing the stator core 100 and the reliability of subsequent steps can be improved.

In some embodiments, at least two first conductors 210 of the plurality of first conductors 210 of the coil unit 200*a* are offset from each other in the circumferential direction. Each of the plurality of first conductors 210 includes a plurality of insertion portions 2011. The plurality of insertion portions 2011 is inserted into different winding slots 120, respectively. The stator winding 200 is provided with at least two insertion portions 2011 stacked together in the axial direction D in each of the plurality of winding slots 120.

Two first conductors 210 of the plurality of first conductors 210 are offset from each other in the circumferential direction, which means that the two first conductors 210 do not completely overlap with each other in the axial direction, and are offset from each other in the circumferential direction. For example, two adjacent first conductors 210 of the coil unit 200*a* are offset from each other by one winding slot 120 in the circumferential direction.

Each of the plurality of first conductors 210 is provided with a plurality of insertion portions 2011, and the plurality of insertion portions 2011 of the first conductor 210 are connected together. In this way, connection steps of the insertion portions 2011 can be reduced. The plurality of insertion portions 2011 of the first conductor 210 are inserted into different winding slots 120, which can improve a stability of relative positions between the first conductor 210 and the stator core 100. At least two first conductors 210 of the coil unit 200*a* may be embedded to and offset from each other, thereby improving a stability of relative positions among the plurality of first conductors 210 of the coil unit 200*a*.

Therefore, in the embodiments of the present disclosure, the structure of the motor can be simplified, thereby improving the assembly efficiency of the motor. Further, the stability of the relative positions between the components in the stator can be improved, thereby prolonging the service life of the stator.

In some embodiments, the coil unit 200*a* is provided with at least two insertion portions 2011 stacked together in the axial direction D in each of the plurality of winding slots 120. The coil unit 200*a* is braided into at least two layers.

In some embodiments, the plurality of first conductors 210 of the coil unit 200*a* are offset from each other in the circumferential direction. The plurality of first conductors 210 are offset from each other in the circumferential direction, which means that any two first conductors 210 do not completely overlap with each other in the axial direction and are offset from each other in the circumferential direction.

In some embodiments, in each of the plurality of winding slots 120, the plurality of insertion portions 2011 are stacked together in the axial direction D. In the embodiments of the present disclosure, different numbers of winding layers may be selected based on electromagnetic performance requirements. Reasonable selection of the number of the winding layers can effectively suppress a skin effect of the AC winding and reduce a temperature rise of the motor. For example, four insertion portions 2011 are stacked together in each of the plurality of winding slots 120.

In some embodiments, the coil unit 200*a* includes a plurality of conductive branches 201, and each of the plurality of conductive branches 201 includes several first conductors 210 connected in series. Two adjacent first conductors 210 of each of the plurality of conductive branches 201 are connected to each other to form a connection structure 2145. All the connection structures 2145 of the coil unit 200*a* are arranged outside the outer wall.

Outside the outer wall 112 refers to a side of the outer wall 112 away from the center of the stator core 100.

For example, the plurality of first conductors 210 of the conductive branch 201 are in the same phase.

The two first conductors 210 may be connected through welding, bonding, snapping, or other manners to form the connection structure 2145. In another exemplary embodiment of the present disclosure, two adjacent first conductors 210 of the conductive branch 201 are welded, and the connection structure 2145 includes a welding spot formed through the welding.

In the embodiments of the present disclosure, the first conductors 210 of the coil unit 200*a* may be connected outside the outer wall 112, and a connection of the first conductors 210 of the coil unit 200*a* inside an inner wall 111 is eliminated. Therefore, process difficulty can be reduced, thereby improving the assembly efficiency.

In some embodiments, each of the plurality of first conductors 210 further includes at least one connection portion 213. Adjacent insertion portions 2011 are connected to each other by the connection portion 213. The at least one connection portion 213 is located inside the inner wall 111.

The number of connection portions 213 is associated with the number of insertion portions 2011. For example, when the first conductor 210 includes Y insertion portions 2011, the number of connection portions 213 may be Y−1, where Y is a positive integer greater than 1.

In another exemplary embodiment of the present disclosure, the connection portion 213 is integrally connected with the insertion portion 2011.

Providing the connection portion 213 at the inner side of the stator core 100 can reduce the connection and assembly process of the plurality of first conductors 210 at the inner side of the stator core 100, thereby reducing the process difficulty.

In some embodiments, the first conductor 210 has an even number of insertion portions 2011.

In some embodiments, the at least one connection portion 213 located inside the inner wall 111 is bent in the axial direction. In this way, the two adjacent insertion portions 2011 connected to the bent connection portion 213 are located at different layers.

For example, in the winding slot 120, the plurality of insertion portions 2011 are stacked together in the axial direction D. In a direction away from the bottom wall surface 121 of the winding slot 120, the plurality of insertion portions 2011 are located at different layers in the winding slot 120. For example, in the direction away from the bottom wall surface 121 of the winding slot 120, R insertion portions 2011 in the winding slot 120 are located at a first layer, a second layer, . . . , and a $R^{th}$ layer respectively, where R is a positive integer greater than 1.

The two insertion portions 2011 connected to the bent connection portion 213 are located at different layers, which means that the two insertion portions 2011 are located at different layers in the corresponding winding slot 120. For example, one insertion portion 2011 connected to the connection portion 213 is located at a first layer in the winding slot 120, and the other insertion portion 2011 connected to the connection portion 213 is located at a second layer in the winding slot 120.

The degree of bending of the connection portion 213 may be set according to a space inside the inner wall.

By bending the connection portion 213, the distance between the insertion portions 2011 in the axial direction D can be changed. In this way, at least two insertion portions 2011 can be arranged at different winding layers, thereby improving the problem of a limited space at the center of the stator core 100. In addition, the risk of interference of different first conductors 210 when the insertion portions 2011 are arranged across the layers and the risk of damage to the insulation coating of the first conductors 210 can be reduced.

In other embodiments, the two insertion portions 2011 connected to the bent connection portion 213 may also be located at one layer.

In some embodiments, a difference of layer numbers between two adjacent insertion portions 2011 of one first conductor 210 is smaller than or equal to 1. For example, if one insertion portion 2011 of the first conductor 210 is located at a first layer in the winding slot 120, another insertion portion 2011 of the first conductor 210 adjacent to the insertion portion 2011 may be located at the first layer or a second layer. Therefore, in the embodiments of the present disclosure, the design of the winding across layers can be simplified.

In some embodiments, the connection portions 213 located inside the inner wall 111 are all bent in the axial direction.

In some embodiments, the first conductor 210 has at least four insertion portions 2011. At least one connection portion 213 is located outside the outer wall 112.

In some embodiments, the two insertion portions 2011 connected to the connection portion 213 outside the outer wall 112 may be located at a same layer or at different layers.

In some embodiments, in the axial direction D of the stator core, a maximum dimension of each of the at least one connection portion 213 is greater than a total dimension of two adjacent insertion portions 2011.

The connection portion 213 may be bent by a greater dimension in the axial direction D. In this way, a stress concentration in the connection portion 213 and a risk of damage to the connection portion 213 can be reduced.

As shown in FIG. 7, the connection portion 213 may be in the form of an outward bending. In this way, the connection portion has a greater curvature during its bending, thereby reducing the bending stress and the risk of the damage.

In some embodiments, the connection portion 213 includes a plurality of bent sections 213*c*. The connection portion 213 is bent for multiple times to form a flared structure, which can reduce the degree of a single bend, thereby reducing the risk of the damage.

In some embodiments, all the connection portions 213 located inside the inner wall 111 are arranged in the circumferential direction of the stator core. In this way, the coil unit 200*a* has a more compact arrangement, thereby reducing a risk of interference between the connection portions 213. The internal arrangement of the stator windings is neat, which can reduce the risk of the damage to the insulation coating of the first conductor 210. Therefore, an insulation reliability of the stator can be improved, and the service life of the stator can be prolonged.

In some embodiments, the first conductor 210 has an integral structure. With this arrangement, the first conductor 210 has a higher connection strength, thereby prolonging the service life of the first conductor 210.

In an exemplary embodiment of the present disclosure, the connection portions 213 and the insertion portions 2011 that are integrally formed may be formed by a deformation of the conductor. For example, when the first conductor 210 is a flat wire, the first conductor 210 may be formed by peeling a coating of a rectangular conductor, blanking, and then molding. In addition, the first conductor 210 may be formed by laser-peeling a coating of a rolled rectangular conductor, accurately blanking, and then performing 3D molding on the blanked rectangular conductor. The first conductor 210 formed through a single 3D stamping molding is then assembled in the winding slots 120. Since the blanking, coating peeling, and 3D molding processes of the first conductor 210 formed through the D3 molding are easily controlled, a conductor cutting is not required. As a result, the process complexity can be lowered, and the production line operation efficiency can be improved.

Figure 9:
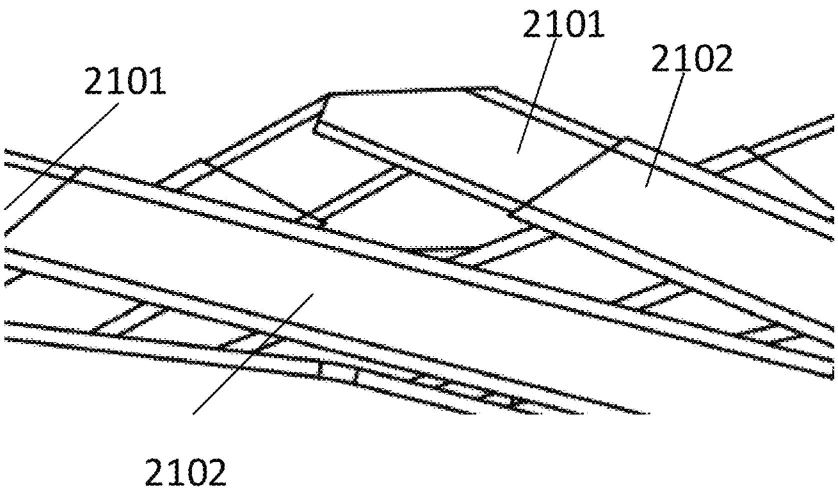
FIG. 9 is a schematic partial view of a stator according to some embodiments of the present disclosure.
Figure 10:
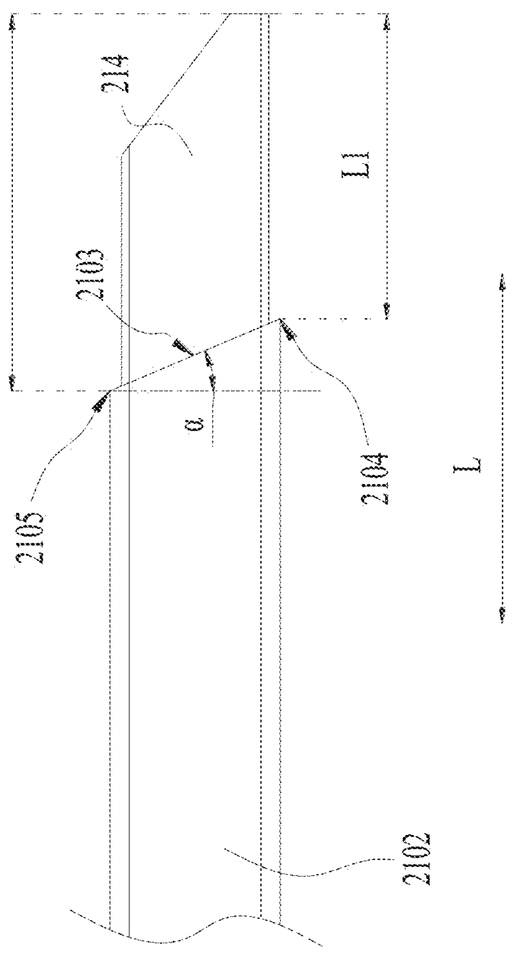
FIG. 10 is a schematic partial structural view of a first conductor of a stator according to some embodiments of the present disclosure.
Figure 11:
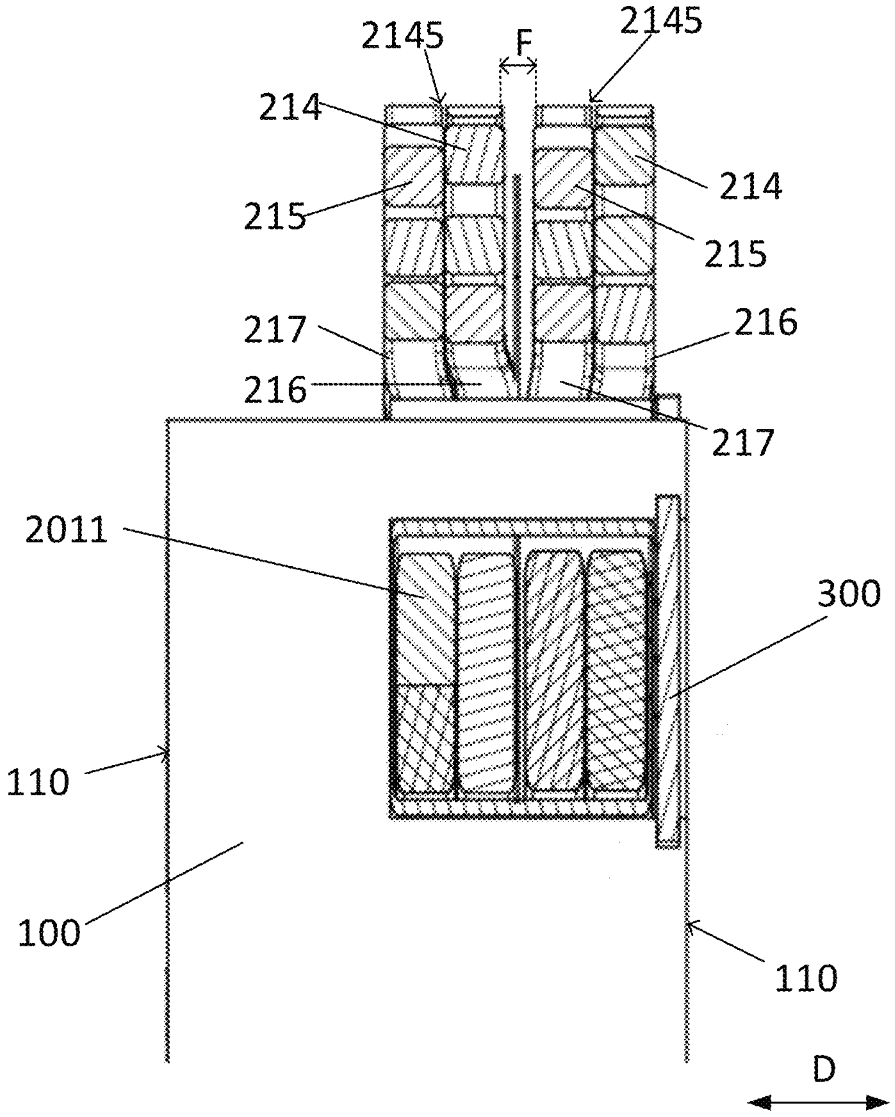
FIG. 11 is a schematic partial cross-sectional view of a stator according to some embodiments of the present disclosure.
Figure 12:
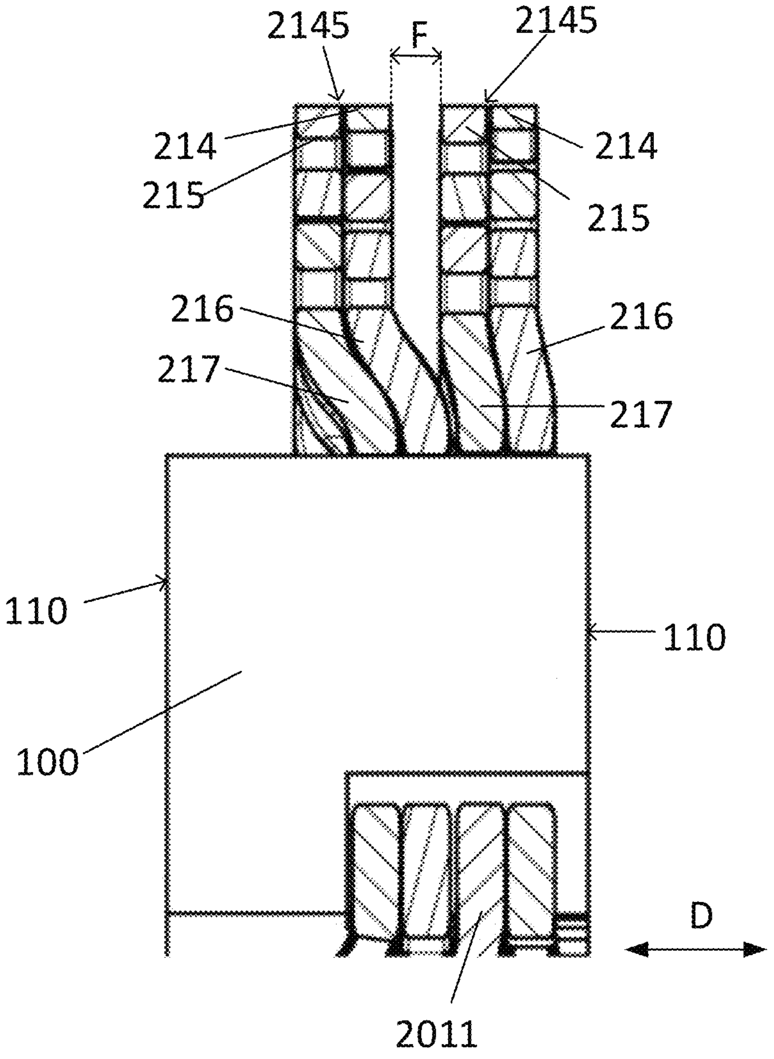
FIG. 12 is a schematic partial cross-sectional view of a stator according to other embodiments of the present disclosure.

FIG. 9 is a schematic partial view of a stator according to some embodiments of the present disclosure. FIG. 10 is a schematic partial structural view of a first conductor of a stator according to some embodiments of the present disclosure. FIG. 11 is a schematic partial cross-sectional view of a stator according to some embodiments of the present disclosure. FIG. 12 is a schematic partial cross-sectional view of a stator according to other embodiments of the present disclosure.

Referring to FIG. 2 to FIG. 5 and FIG. 9 to FIG. 12, in some embodiments, each of the plurality of first conductors 210 is provided with a first pin 214 and a second pin 215 at two ends of the first conductor 210. In two adjacent first conductors 210 of each of the plurality of conductive branches 201, the first pin 214 of one of the two adjacent first conductors 210 and the second pin 215 of another one of the two adjacent first conductors 210 are connected to each other to form a connection structure 2145.

By providing the first pin 214 and the second pin 215, the connection between the first conductors 210 can be easily implemented.

In some embodiments, in two adjacent first conductors 210 of each of the plurality of conductive branches 201, the first pin 214 of one of the two adjacent first conductors 210 and the second pin 215 of another one of the two adjacent first conductors 210 overlap with each other in the axial direction D of the stator core. The first pin 214 and the second pin 215 are welded to each other to form the connection structure 2145 in an overlapping region.

For example, the connection structure 2145 includes an overlapping part between the first pin 214 and the second pin 215 and a welding spot formed through the welding.

For example, the first pin 214 and the second pin 215 are welded through TIG (Tungsten Inert Gas Welding) welding, laser welding, or other welding.

By allowing the first pin 214 of one first conductor 210 and the second pin 215 of the other first conductor 210 to overlap with each other in the axial direction D, welding between the two first conductors 210 can be facilitated. Further, the stability of the relative position between the first pin 214 and the second pin 215 can be improved, and an overcurrent capability of the first pin 214 and the second pin 215 can be improved.

In some embodiments, during the welding, identification of automatic welding may be achieved by axially rotating the stator or a welding head. The welding may be implemented by performing single-point welding or multi-point simultaneously. As a result, the production efficiency is high. The welded part of the pre-formed coil unit 200*a* has a good position. During the welding, the first conductor 210 is in a natural state, and thus a resilience force and an internal stress are small, thereby reducing the risk of cracking.

In some embodiments, all the connection structures 2145 of the coil unit 200*a* are arranged at intervals in the circumferential direction. There is a gap between adjacent connection structures 2145. When the first pin 214 and the second pin 215 are welded to each other to form the connection structure 2145, a welding distance can be increased and a mutual influence during the welding can be reduced. In addition, by arranging the connection structures 2145 at intervals, the risk of contact short circuits of the connection structures 2145 can be reduced.

In some embodiments, the stator winding 200 includes a plurality of coil units 200*a*. the plurality of coil units 200*a* is stacked together in the axial direction D.

In two adjacent coil units 200*a* of the plurality of coils units 200*a*, at least one connection structure 2145 of one of the two adjacent coil units 200*a* and the connection structure 2145 of another one of the two adjacent coil units 200*a* are offset from each other in the circumferential direction. In other words, at least one connection structure 2145 of one coil unit 200*a* does not overlap with another connection structure 2145 of the coil unit 200*a* in the axial direction D.

The connection structures 2145 of two adjacent coil units 200*a* are spaced apart from each other in the circumferential direction, which can increase the spacing between the connection structures 2145 of the two coil units 200*a*. On the one hand, when the first pin 214 and the second pin 215 are welded to each other to form the connection structure 2145, the welding distance can be increased and mutual influence during the welding can be improved. In the embodiments of the present disclosure, an electrical clearance between the connection structures 2145 can be increased, and the insulation requirements at the connection structure 2145 can be reduced. Moreover, the process complexity can be reduced, raw materials can be saved, and the production line operation rhythm can be improved.

In some embodiments, when the coil unit 200*a* is inserted into the winding slot 120, since there is a sufficient distance between the connection structures 2145 of different coil units 200*a*, flaring and deformation processing is not required to be carried out on the first pin 214 and the second pin 215 in the connection structure 2145. In this way, the complexity of the process can be lowered, the stability of the position of the first pin 214 and the second pin 215 can be ensured without flaring and deformation processing, thereby reducing the risk of cracking during the welding.

In addition, in the embodiments of the present disclosure, an axial dimension of the stator can be further shortened, and thus the motor has a smaller axial dimension and lighter weight. When the motor is applied to a vehicle, an unsprung mass can be reduced. A plurality of links and air springs are provided, which is more conducive to controllability of a chassis.

In another exemplary embodiment of the present disclosure, the plurality of connection structures 2145 of each of the coil units 200*a* are evenly distributed in the circumferential direction.

In some embodiments, the first conductor 210 includes a wire 2101 and an insulation coating 2102 wrapping around the wire 2101. An end of the insulation coating 2102 has a first opening 2103. The wire 2101 includes a first pin 214, and the first pin 214 extends out through the first opening 2103. The first opening 2103 has a first edge 2104 close to the outer wall 112 and a second edge 2105 away from the outer wall 112. In an extending direction L of the first pin 214, a distance L1 between the first edge 2104 and an end of the first pin 214 is smaller than or equal to a distance L2 between the second edge 2105 and the end of the first pin 214.

The wire 2101 is a main part of the first conductor 210 for achieving a conductive function. The insulation coating 2102 can insulate the wire 2101 from the stator core 100.

The first pin 214 extends out through the first opening 2103 to facilitate connection to other first conductors 210. Therefore, interference of the insulation coating 2102 with the connection between the first pin 214 and other first conductors 210 can be reduced.

As shown in FIG. 9, in the embodiments of the present disclosure, the part of the insulation coating 2102 close to the outer wall 112 has a larger length. As a result, the insulation between the two first conductors 210 can be improved when another first conductor 210 passes between the insulation coating 2102 and the outer wall 112.

In some embodiments, an angle $\alpha$ between a plane where the first opening 2103 is located and a virtual plane ranges from 0° to 30°. The virtual plane is perpendicular to the extending direction L of the first pin 214 and passes through the second edge 2105.

In the embodiments of the present disclosure, defining the angle $\alpha$ to range from 0° to 30° may balance an area of the wire 2101 covered by the insulation coating 2102 and an exposed dimension of the first pin 214, thereby improving insulation performance and facilitating the connection between the first pin 214 and other structures.

In another exemplary embodiment of the present disclosure, the angle $\alpha$ is 0°, 5°, 10°, 15°, 20°, 25°, or 30°.

In some embodiments, the angle $\alpha$ ranges from 5° to 30°. The first opening 2103 is an inclined opening. In the embodiments of the present disclosure, insulation reliability can be improved.

In some embodiments, each of the plurality of first conductors 210 further includes a first connection arm 216 and a second connection arm 217. The first pin 214 is connected to one of the two adjacent insertion portions 2011 by the first connection arm 216. The second pin 215 is connected to another one of the two insertion portions 2011 by the second connection arm 217.

In another exemplary embodiment of the present disclosure, the first connection arm 216 and the second connection arm 217 are located outside the stator core 100.

In another exemplary embodiment of the present disclosure, the first connection arm 216, the second connection arm 217, the plurality of insertion portions 2011, the first pin 214, and the second pin 215 are integrally formed structures.

A position of the first pin 214 may be adjusted by controlling a shape and a dimension of the first connection arm 216, and a position of the second pin 215 may be adjusted by controlling a shape and a dimension of the second connection arm 217. As a result, the first pin 214 and the second pin 215 may be located in suitable positions.

For example, when the first pin 214 and the second pin 215 are welded to each other, the influence of a high temperature on other components of the first conductor during the welding can be reduced. Meanwhile, it is convenient to carry out the welding operations on the first pin 214 and the second pin 215.

In some embodiments, the stator winding 200 includes a plurality of coil units 200*a* stacked together in the axial direction D. In adjacent coil units 200*a* of the plurality of coil units 200*a*, the first connection arm 216 and the second connection arm 217 of the at least one first conductor 210 of one of the two adjacent coil units 200*a* are bent away from another one of the two adjacent coil units 200*a*.

By bending the first connection arm 216 and the second connection arm 217 of the first conductor 210, the spacing between the connection structures 2145 of the two coil units 200*a* can be increased, thereby reducing insulation requirements at the connection structure 2145. Therefore, the process complexity can be reduced, and the insulation can be improved.

In the embodiments of the present disclosure, the parts of the coil unit 200*a* located outside the outer wall are arranged more stably and neatly.

In some embodiments, in two adjacent coil units 200*a* of the plurality of coil units 200*a*, the first connection arms 216 and the second connection arms 217 of the plurality of first conductors 210 of one of the two adjacent coil units 200*a* are bent away from another one of the two adjacent coil units 200*a*.

As shown in FIG. 11, in some embodiments, in two adjacent coil units 200*a*, the first connection arm 216 and the second connection arm 217 of the first conductor 210 of one coil unit 200*a* are bent toward one side in the axial direction D, and the first connection arm 216 and the second connection arm 217 of the first conductor 210 of the other coil unit 200*a* are bent toward the other side in the axial direction D.

In the embodiments of the present disclosure, the degree of bending of the first connection arm 216 and the second connection arm 217 can be reduced, thereby increasing an outer diameter of the stator core. Therefore, the performance of the motor can be enhanced to output a greater torque.

As shown in FIG. 12, in other embodiments, the first connection arm 216 and the second connection arm 217 of the first conductors 210 of two adjacent coil units 200*a* are bent towards one side in the axial direction D. The degree of bending of the first connection arm 216 and the second connection arm 217 of one coil unit 200*a* is greater than the degree of bending of the first connection arm 216 and the second connection arm 217 of the other coil unit 200*a*.

In the embodiments of the present disclosure, the degree of bending of the first connection arm 216 and the second connection arm 217 can be increase, thereby reducing the maximum size of the stator in the radial direction, which can reduce a total weight of the motor.

In some embodiments, in the axial direction D, a minimum spacing F between the connection structures 2145 of two adjacent coil units 200*a* is greater than or equal to 1 mm. In the embodiments of the present disclosure, the electrical clearance of the stator can be increased, thereby improving the insulation performance of the stator. Therefore, the reliability of the stator can be improved, thereby prolonging the service life of the stator.

A span between adjacent insertion portions 2011 of the first conductor 210 may be a full pitch, a long pitch, or a short pitch to adapt to different windings.

In some embodiments, the span between two adjacent insertion portions 2011 of at least one first conductor 210 is equal to a pole pitch. That is, the span between two adjacent insertion portions 2011 of at least one first conductor 210 is a full pitch.

In the embodiments of the present disclosure, the winding structure of the first conductor can be simplified.

In other embodiments, the span between two adjacent insertion portions 2011 of at least one first conductor 210 is smaller than a pole pitch. The windings with the short pitch can reduce space harmonics and improve NVH.

Figure 13:
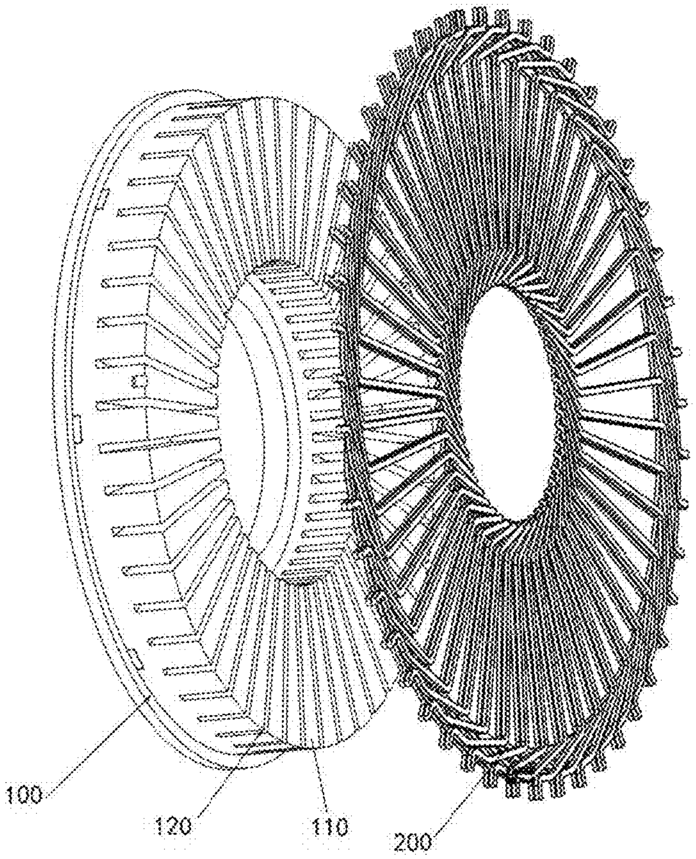
FIG. 13 is a schematic structural view of a stator of a motor according to other embodiments of the present disclosure.
Figure 14:
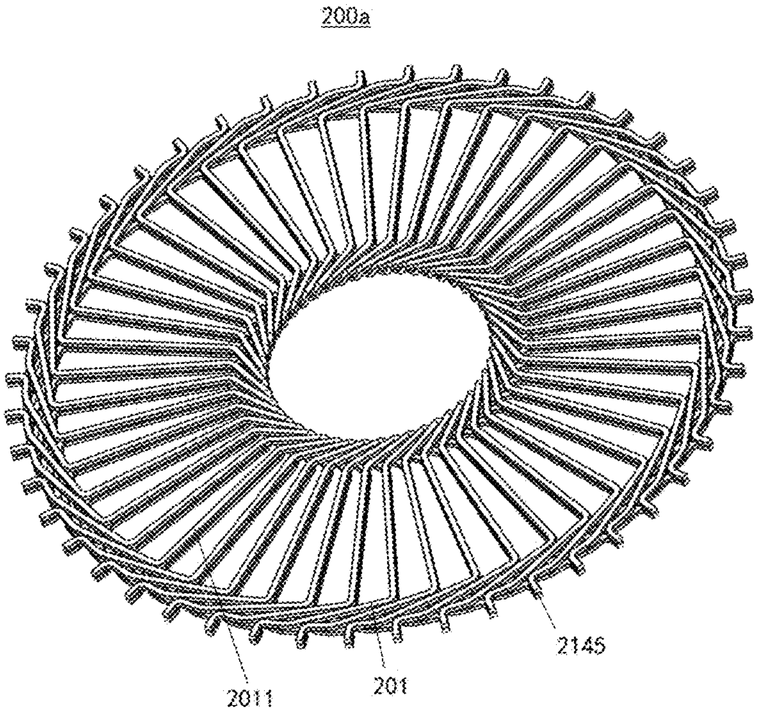
FIG. 14 is a schematic structural view of a coil unit shown in FIG. 13.
Figure 15:
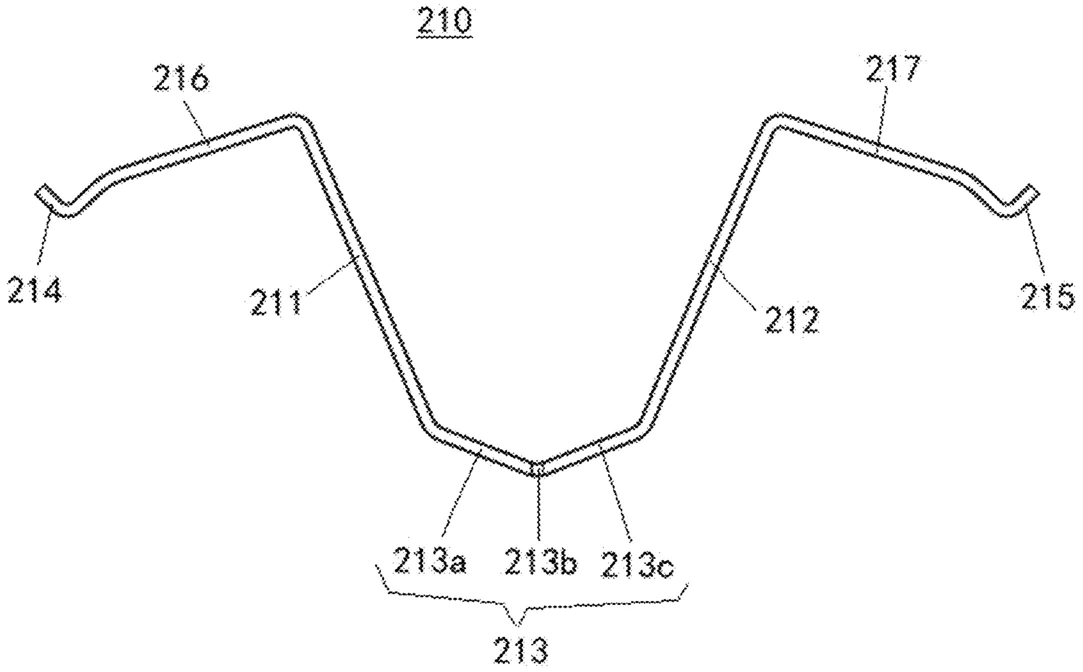
FIG. 15 is a schematic structural view of a first conductor of a stator according to some embodiments of the present disclosure.
Figure 16:
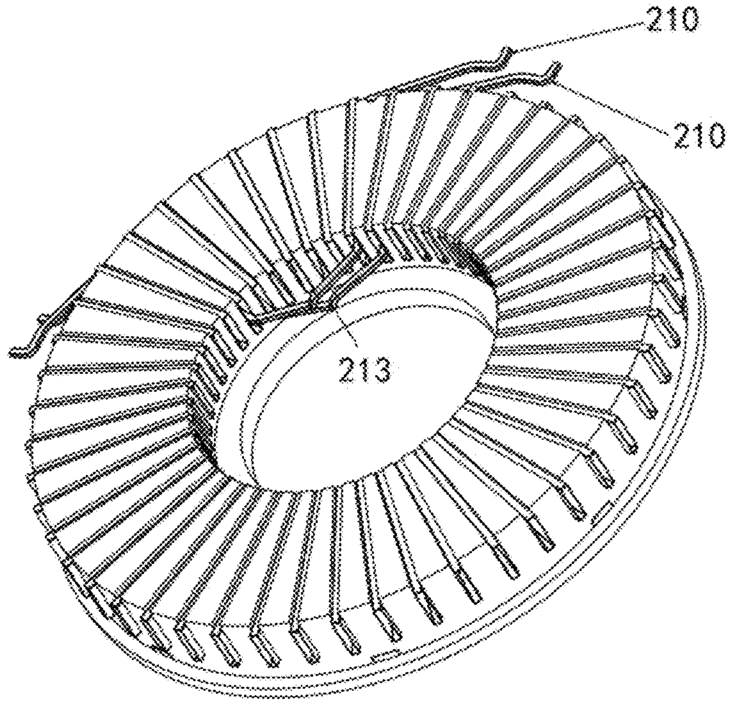
FIG. 16 is a schematic view of a stator in FIG. 13 during assembly.
Figure 17:
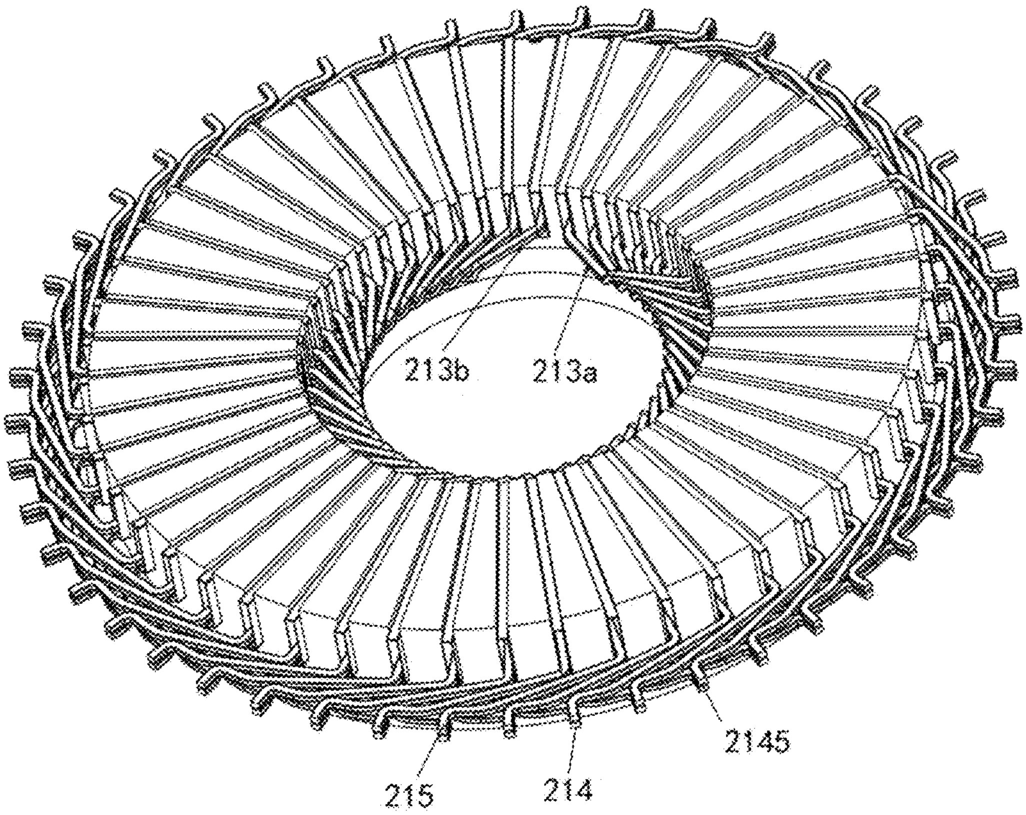
FIG. 17 is another schematic view of a stator in FIG. 13 during assembly.

FIG. 13 is a schematic structural view of a stator of a motor according to other embodiments of the present disclosure. FIG. 14 is a schematic structural view of the coil unit shown in FIG. 13. FIG. 15 is a schematic structural view of a first conductor of a stator according to some embodiments of the present disclosure. FIG. 16 is a schematic view of the stator shown in FIG. 13 during an assembly. FIG. 17 is another schematic view of the stator shown in FIG. 13 during the assembly.

In some embodiments, as shown in FIG. 13 to FIG. 17, the plurality of first conductors 210 of the coil unit 200*a* are offset from each other in the circumferential direction. Each of the plurality of first conductors 210 includes a first insertion portion 211 and a second insertion portion 212 connected to each other. The first insertion portion 211 and the second insertion portion 212 are respectively inserted into different winding slots 120. In one winding slot 120, the first insertion portion 211 of one first conductor 210 and the second insertion portion 212 of another first conductor 210 of the coil unit 200*a* are stacked together.

The plurality of first conductors 210 are offset from each other in the circumferential direction means that any two of the plurality of first conductors 210 do not completely overlap with each other in the axial direction, and the plurality of first conductors 210 are at least partially offset from each other in the circumferential direction. For example, as shown in FIG. 16, two adjacent first conductors 210 are offset from each other by one winding slot 120 in the circumferential direction.

The first insertion portion 211 of one first conductor 210 and the second insertion portion 212 of the other first conductor 210 of the coil unit 200*a* are stacked together means that the first insertion portion of one first conductor 210 and the second insertion portion 212 of the other first conductor 210 of the coil unit 200*a* are stacked together in the axial direction of the stator core 100.

In the above technical solution, the first insertion portion 211 and the second insertion portion 212 of the first conductor 210 are respectively inserted into different winding slots 120, which can improve a stability of a relative position of the first conductor 210 and the stator core 100. The first insertion portion 211 of one first conductor 210 and the second insertion portion 212 of the other first conductor 210 of the coil unit 200*a* are stacked together, allowing the two first conductors 210 to be stacked and embedded in each other, thereby improving stability of relative positions among the plurality of first conductors 210 of the coil unit 200*a*. Therefore, the embodiments of the present disclosure can not only simplify the structure of the motor and improve the assembly efficiency of the motor, but also improve the stability of the relative positions between components in the stator to prolong the service life of the stator.

In some embodiments, the first insertion portion 211 and the second insertion portion 212 of one first conductor 210 are arranged in the circumferential direction. In one of the plurality of winding slots 120, the first insertion portion 211 of one first conductor 210 of the coil unit 200*a* is located at a side of the second insertion portion 212 of the other first conductor 210 of the coil unit 200*a* close to a bottom wall of the winding slot 120.

The circumferential direction may be a clockwise or counterclockwise direction.

In an exemplary embodiment of the present disclosure, as shown in FIG. 16 and FIG. 17, one or more winding slots 120 may also be arranged between the winding slot 120 corresponding to the first insertion portion 211 and the winding slot 120 corresponding to the second insertion portion 212. In the above technical solution, the first conductor 210 spans across several winding slots 120 by means of the first insertion portion 211 and the second insertion portion 212. On the one hand, a dimension of the first conductor 210 can be increased. On the other hand, at least part of other first conductors 210 of one coil unit 200*a* may be inserted into these several winding slots 120, allowing the plurality of first conductors 210 to be embedded with each other, and thus improving the stability of the relative positions among the plurality of first conductors 210.

In the above technical solution, in one of the plurality of winding slots 120, the first insertion portion 211 of the first conductor 210 is closer to the bottom wall of the winding slot 120, allowing the plurality of first conductors 210 to be sequentially woven, stacked, and embedded to form a coil unit 200*a* with two layers of winding. In this case, the first insertion portion 211 of the first conductor 210 is located at one layer of the winding, and the second insertion portion 212 is located at another layer of the winding. The plurality of first conductors 210 may be embedded in each other and limited by each other to improve the stability of relative positions among the plurality of first conductors 210 of the coil unit 200*a*.

In the stator according to the embodiments of the present disclosure, the coil unit 200*a* of the stator winding 200 may be considered to include two layers of windings, and the first insertion portion 211 and the second insertion portion 212 of one first conductor 210 are located at different layers of the windings, respectively. For example, the coil unit 200*a* includes an upper winding layer and a lower winding layer. The first insertion portion 211 of one first conductor 210 may be located at the lower winding layer, and the second insertion portion 212 may be located at the upper winding layer. In this way, the plurality of first conductors 210 can be embedded with each other. The lower winding layer is, for example, a winding layer close to the bottom wall of the winding slot 120. The upper winding layer is, for example, a winding layer away from the bottom wall of the winding slot 120. In other embodiments, the first insertion portion 211 of one first conductor 210 may also be located at the upper winding layer, and the second insertion portion 212 may be located at the lower winding layer.

In some embodiments, a span between the first insertion portion 211 and the second insertion portion 212 of at least one first conductor 210 is equal to a pole pitch, which can simplify a winding structure of the first conductors 210. For example, when the span between the first insertion portion 211 and the second insertion portion 212 of one first conductor 210 is equal to six winding slots 120, the pole pitch is six winding slots 120.

In some embodiments, a span between the first insertion portion 211 and the second insertion portion 212 of each of the plurality of first conductors 210 is equal to a pole pitch.

Figure 18:
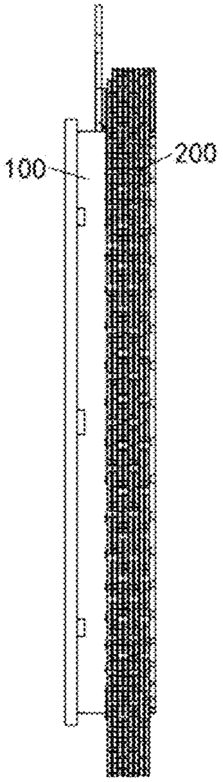
FIG. 18 is a schematic structural view of a stator according to some embodiments of the present disclosure in another direction.
Figure 19:
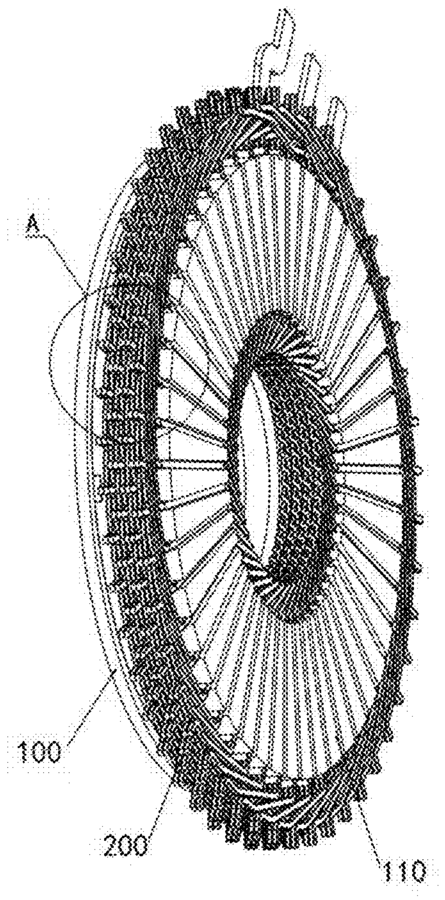
FIG. 19 is a schematic structural view of a stator according to some embodiments of the present disclosure in another direction.
Figure 20:
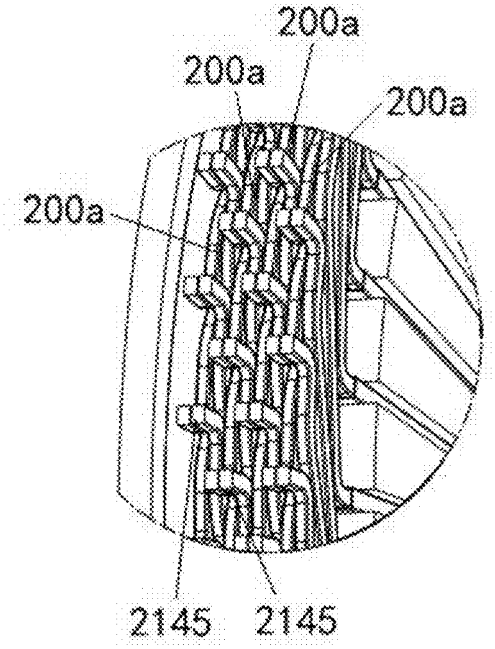
FIG. 20 is a schematic partially enlarged structural view of part A shown in FIG. 19.

FIG. 18 is a schematic structural view of a stator according to some embodiments of the present disclosure in another direction. FIG. 19 is a schematic structural view of a stator according to some embodiments of the present disclosure in another direction. FIG. 20 is a partially enlarged schematic structural view at part A in FIG. 19.

In some embodiments, as shown in FIG. 13 to FIG. 19, the stator winding 200 includes a plurality of coil units 200*a* stacked together in the axial direction of the stator core 100.

In the above technical solution, magnetic flux of the stator can be increased by providing the plurality of coil units 200*a*.

When the stator winding 200 includes the plurality of coil units 200*a*, the plurality of coil units 200*a* can be inserted into the winding slots 120 of the stator core 100 in a single step. In another embodiment of the present disclosure, the plurality of coil units 200*a* may be inserted into the winding slots 120 of the stator core 100 in several steps, and in this case, one coil unit 200*a* is inserted into the winding slots 120 of the stator core 100 in each step. When inserting one coil unit 200*a* into the winding slots 120 of the stator core 100, the plurality of first conductors 210 may be connected to form one coil unit 200*a* first, and then the coil unit 200*a* is inserted into the plurality of winding slots 120 of the stator core 100 as a whole. In another embodiment of the present disclosure, the plurality of first conductors 210 may be inserted into the winding slots 120 in several steps, and in this case, one first conductor 210 is inserted into the winding slots 120 of the stator core 100 in each step.

In some embodiments, the first insertion portion 211 and the second insertion portion 212 of one first conductor 210 are arranged in the circumferential direction. Each of the plurality of first conductors 210 further includes a connection portion 213 connecting the first insertion portion 211 and the second insertion portion 212.

In an exemplary embodiment of the present disclosure, the connection portion 213, the first insertion portion 211, and the second insertion portion 212 may be integrally formed. In other embodiments, the connection portion 213 may also be separated from the first insertion portion 211 and the second insertion portion 212.

In the above technical solution, the first insertion portion 211 and the second insertion portion 212 can be connected by the connection portion 213.

In some embodiments, the connection portion 213 is located at a side of the first insertion portion 211 and the second insertion portion 212 facing towards a center of the stator core 100.

In the above technical solution, by arranging the connection portion 213 at the inner side of the stator core 100, the welding of the plurality of first conductors 210 at the inner side of the stator core 100 can be reduced, thereby lowering process difficulty.

In some embodiments, the connection portion 213 includes a first connection section 213*a* and a second connection section 213*b*. The first connection section 213*a* extends from an end of the first insertion portion 211 close to the center of the stator core 100. The first connection section 213*a* is inclined and bent towards the second insertion portion 212. The second connection section 213*b* extends from an end of the second insertion portion 212 close to the center of the stator core 100. The second connection section 213*b* is inclined and bent towards the first insertion portion 211. The first connection section 213*a* is connected to the second connection section 213*b*.

In the above technical solution, the first connection section 213*a* and the second connection section 213*b* are formed by extending towards each other. As a result, a total dimension of the connection portion 213 can be reduced, thereby reducing a size of a space occupied by the connection portion 213 in the center of the stator core 100.

In an exemplary embodiment of the present disclosure, in two adjacent first conductors 210 of one coil unit 200*a*, the first connection section 213*a* of one of the two adjacent first conductors 210 and the second connection section 213*b* of the other one of the two adjacent first conductors 210 overlap with each other and are stacked together in the axial direction. As a result, the first connection section 213*a* and the second connection section 213*b* of the two adjacent first conductors 210 are limited by each other. Therefore, the stability of the relative positions among the plurality of first conductors 210 can be improved.

In an exemplary embodiment of the present disclosure, in three adjacent first conductors 210 of one coil unit 200*a* in the circumferential direction, the first connection section 213*a* of one of the three adjacent first conductors 210 is located at a side of the second connection section 213*b* of the previous first conductor 210 close to the bottom wall of the winding slot 120, and the second connection section 213*b* of the one of the three adjacent first conductors 210 is located at a side of the first connection section 213*a* of the subsequent first conductor 210 away from the bottom wall of the winding slot 120.

In the above solution, in the phrase "the first connection section 213*a* of one of the three adjacent first conductors 210 is located at a side of the second connection section 213*b* of the previous first conductor 210 close to the bottom wall of the winding slot 120", the positional relationship between the first connection section 213*a* and the second connection section 213*b* in the axial direction will be described only by taking the bottom wall of the winding slot 120 as a reference. Similarly, in the phrase "the second connection section 213*b* of one of the three adjacent first conductors 210 is located at a side of the first connection section 213*a* of the subsequent first conductor 210 away from the bottom wall of the winding slot 120," the positional relationship between the second connection section 213*b* and the first connection section 213*a* will be described only by taking the bottom wall of the winding slot 120 as a reference.

As mentioned above, the circumferential direction may be the clockwise or counterclockwise direction. When the circumferential direction is the clockwise direction, the first conductor 210 located in front of one of the first conductors 210 is the first conductor 210 located at a side of the one of the first conductors 210 in the counterclockwise direction, and the first conductor 210 located behind one of the first conductors 210 is the first conductor 210 located at a side of the one of the first conductors 210 in the clockwise direction.

In the embodiments of the present disclosure, in three first conductors 210 of one coil unit 200*a* arranged in the circumferential direction, the three first conductors 210 sequentially include for example a conductor X1, a conductor X2, and a conductor X3 in the circumferential direction. The first connection section 213*a* of the conductor X2 is located at a side of the second connection section 213*b* of the conductor X1 facing towards the bottom wall of the winding slot 120. The second connection section 213*b* of the conductor X2 is located at the side of the first connection section 213*a* of the conductor X3 away from the bottom wall of the winding slot 120. That is, the second connection section 213*b* of the conductor X2 is pressed against the first connection section 213*a* of the conductor X3 towards the bottom wall of the winding slot 120, and the first connection section 213*a* of the conductor X1 is pressed against the second connection section 213*b* of the conductor X2 toward the bottom wall of the winding slot 120. That is, the first connection section 213*a* of the conductor X2 is pressed, and the second connection section 213*b* of the conductor X2 is pressed against another first connection section 213*a*. In this way, the plurality of first conductors 210 can be embedded in each other sequentially.

In an exemplary embodiment of the present disclosure, the conductor X1, the conductor X2, and the conductor X3 may be arranged adjacent to each other, or other first conductors 210 may be interposed between the conductor X1 and the conductor X2, and other first conductors 210 may be interposed between the conductor X2 and the conductor X3.

In some embodiments, the plurality of first conductors 210 are offset from each other in the circumferential direction. The first connection section 213*a* of one first conductor 210 is located at a side of the second connection sections 213*b* of the previous plurality of first conductors 210 close to the bottom wall of the winding slot 120, and the second connection section 213*b* of the first conductor 210 is located at a side of the first connection sections 213*a* of the subsequent plurality of first conductors 210 away from the bottom wall of the winding slot 120.

In the above technical solution, the first connection section 213*a* of the first conductor 210 is pressed towards the bottom wall of the winding groove 120 by the second connection sections 213*b* of several other first conductors 210, and the second connection section 213*b* of the first conductor 210 is presses against the first connection sections 213*a* of several other first conductors 210 towards the bottom wall of the winding groove 120. The plurality of first conductors 210 are stacked and embedded sequentially, which can improve the stability of the relative positions among the plurality of first conductors 210.

Figure 21:
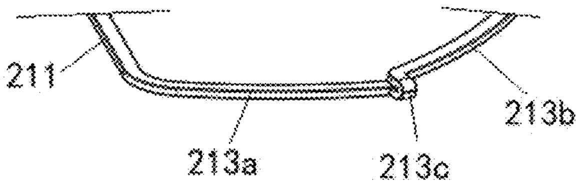
FIG. 21 is a schematic partial structural view of a first conductor of a stator according to some embodiments of the present disclosure.
Figure 22:
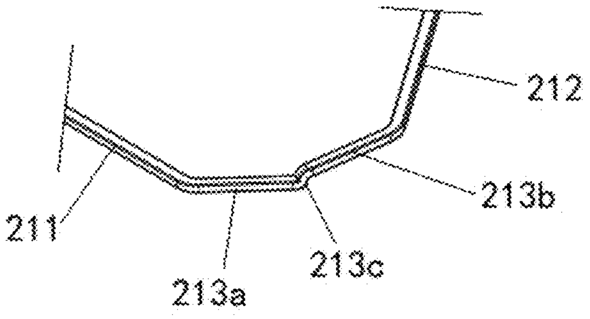
FIG. 22 is a schematic partial structural view of a first conductor of a stator according to other embodiments of the present disclosure.
Figure 23:
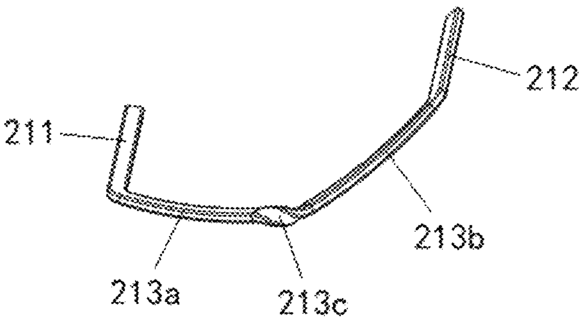
FIG. 23 is a schematic partial structural view of a first conductor of a stator according to further other embodiments of the present disclosure.
Figure 24:
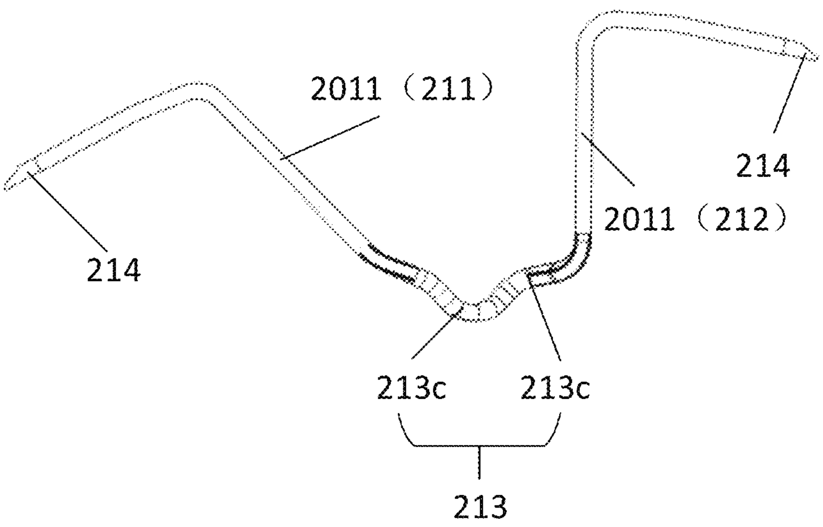
FIG. 24 is a schematic partial structural view of a first conductor of a stator according to yet other embodiments of the present disclosure.

FIG. 21 is a schematic partial structural view of a first conductor 210 of a stator according to some embodiments of the present disclosure, FIG. 22 is a schematic partial structural view of a first conductor 210 of a stator according to other embodiments of the present disclosure, FIG. 23 is a schematic partial structural view of a first conductor 210 of a stator according to other embodiments of the present disclosure, and FIG. 24 is a schematic partial structural view of a first conductor 210 of a stator according to other embodiments of the present disclosure.

In some embodiments, as shown in FIG. 21 to FIG. 23, the connection portion 213 further includes a bent section 213*c* connecting the first connection section 213*a* and the second connection section 213*b*.

The bent section 213*c* may be provided in various ways, such as by twisting, bending, flipping out, or folding, to allow the connection portion 213 to be partially or wholly bent to form the bent section 213*c*.

In the above technical solution, by providing the bent section 213*c*, a distance between the first insertion portion 211 and the second insertion portion 212 in the axial direction can be changed, which can position the first insertion portion 211 and the second insertion portion 212 at different winding layers, thereby improving the limited space at the center of the stator core 100. In addition, the risk of interference of different first conductors 210 when the first insertion portion 211 and the second insertion portion 212 are arranged across the layers and the risk of damage to the insulation coating of the first conductor 210 can be reduced.

In some embodiments, as shown in FIG. 24, the first conductor 210 may include a plurality of bent sections 213*c*. In another exemplary embodiment of the present disclosure, the first conductor 210 may have no first connection section 213*a* and the second connection section 213*b*.

In some embodiments, the first conductor 210 has an integral structure. For example, the first insertion portion 211, the second insertion portion 212, and the connection portion 213 are integrally formed.

In an exemplary embodiment of the present disclosure, the first insertion portion 211, the second insertion portion 212, and the connection portion 213 are integrally formed into a U-shaped structure. The first insertion portion 211 and the second insertion portion 212 are two wall parts of the U-shaped structure, and the connection portion 213 is a bottom part of the U-shaped structure.

In the above technical solution, when the first conductor 210 has an integral structure, for example, the first insertion portion 211, the second insertion portion 212, and the connection portion 213 are integrally formed, the first conductor 210 has high structural strength, which can prolong the service life of the first conductor 210. In an exemplary embodiment of the present disclosure, the first insertion portion 211, the second insertion portion 212, and the connection portion 213 that are integrally formed are formed by a deformation of the conductor. For example, when the first conductor 210 is a flat wire, the first conductor 210 may be formed by peeling a coating of a rectangular conductor, blanking, and then molding. In addition, the first conductor 210 may be formed by laser-peeling a coating of a rolled rectangular conductor, accurately blanking, and then performing 3D molding on the blanked rectangular conductor. The first conductor 210 formed through a single 3D stamping molding is then assembled in the winding slots 120. Since the blanking, coating peeling, and 3D molding processes of the first conductor 210 formed through the D3 molding are easily controlled, a conductor cutting is not required. As a result, the process complexity can be lowered, and the production line operation efficiency can be improved.

In some embodiments, as shown in FIG. 13 to FIG. 20, each of the plurality of first conductors 210 further includes a first pin 214 and a second pin 215. The first pin 214 is connected to an end of the first insertion portion 211 facing away from the connection portion 213. The second pin 215 is connected to an end of the second insertion portion 212 facing away from the connection portion 213. The coil unit 200*a* includes a plurality of conductive branches 201, and each of the conductive branches 201 includes several first conductors 210 connected in series. In two adjacent first conductors 210 of the conductive branch 201, the first pin 214 of one of the two adjacent first conductors 210 is connected to the second pin 215 of the other one of the two adjacent first conductors 210.

In an exemplary embodiment of the present disclosure, the first pin 214 and the second pin 215 are formed by extending away from the center of the stator core 100 in the radial direction of the stator core 100.

In the above technical solution, the first conductor 210 also has the first pin 214 and the second pin 215. With this arrangement, the first conductor 210 can be connected to other first conductors 210 by means of the first pin 214 and the second pin 215. At least two first conductors 210 of the coil unit 200*a* are connected in series by means of the first pin 214 and the second pin 215 to form the conductive branch 201.

In some embodiments, as shown in FIG. 3 to FIG. 8, in two adjacent first conductors 210 of the conductive branch 201, the first pin 214 of one of the two adjacent first conductors 210 overlaps and is connected with the second pin 215 of another one of the two adjacent first conductors 210 in the axial direction. In this way, a contact area between the first pin 214 and the second pin 215 can be increased. As a result, a stability of the relative position of the first pin 214 and the second pin 215 can be ensured. In addition, an overcurrent of the first pin 214 and the second pin 215 can be increased.

In an exemplary embodiment of the present disclosure, in at least two first conductors 210, the first pin 214 of one of the at least two first conductors 210 and the second pin 215 of the other one of the at least two conductors 210 completely overlap and are connected with each other in the axial direction of the stator core 100.

In the above technical solution, two first conductors 210 completely overlap with each other through the first pin 214 and the second pin 215. In this way, the contact area between the first pin 214 and the second pin 215 can be increased, thereby ensuring a sufficient overcurrent area between the two first conductors 210. In addition, the first conductors 210 may also be connected in series to form a complete conductive branch 201 by means of the first pin 214 and the second pin 215.

In an exemplary embodiment of the present disclosure, in two adjacent first conductors 210 of the conductive branch 201, the first pin 214 and the second pin 215 are welded to each other in an overlapping region. Exemplarily, the first pin 214 and the second pin 215 are welded through TIG (Tungsten Inert Gas Welding) welding, laser welding, or other welding.

In some embodiments, as shown in FIG. 3 to FIG. 8, an overlapping and connection part between the first pin 214 and the second pin 215 is formed as a connection structure 2145. The coil unit 200*a* includes a plurality of connection structures 2145 arranged at intervals in the circumferential direction.

The connection structure 2145 refers to an overlapping part between the first pin 214 and the second pin 215 connected to each other. In an exemplary embodiment of the present disclosure, the first pin 214 and the second pin 215 may be welded to each other in a region where the connection structure 2145 is located.

In the above technical solution, the plurality of connection structures 2145 are arranged at intervals in the circumferential direction, and gaps are formed between adjacent connection structures 2145. When the first pin 214 and the second pin 215 are welded to each other to form the connection structure 2145, a welding distance can be increased, thereby improving mutual influence during the welding.

In some embodiments, as shown in FIG. 3 to FIG. 8, the stator winding 200 includes a plurality of coil units 200*a* stacked together in the axial direction. The connection structures 2145 of two adjacent coil units 200*a* of the plurality of coil units 200*a* are offset from each other in the circumferential direction.

In the above technical solution, the connection structures 2145 of two adjacent coil units 200*a* are arranged at intervals in the circumferential direction, which can increase a spacing between the connection structures 2145 of the two coil units 200*a*. On the one hand, when the first pin 214 and the second pin 215 are welded to each other to form the connection structure 2145, the welding distance can be increased, thereby improving mutual influence during the welding. When the coil unit 200*a* is inserted into the winding slots 120, since there is a sufficient spacing between the connection structures 2145 of different coil units 200*a*, flaring and deformation processing is not required to be carried out on the first pin 214 and the second pin 215 in the connection structure 2145. In this way, the complexity of the process can be lowered, the stability of the position of the first pin 214 and the second pin 215 can be ensured without flaring and deformation processing, thereby reducing the risk of cracking during the welding. On the other hand, an electrical clearance between the connection structures 2145 can be increased, thereby improving the safety performance of the stator.

In the above technical solution, the axial dimension of the stator can be further shortened. As a result, the motor has a smaller axial dimension and a lighter weight. When the motor is applied to a vehicle, an unsprung mass can be reduced. A plurality of links suspension structures and air springs are provided, which is more conducive to improving controllability of the chassis. The connection structures 2145 of the adjacent coil units 200*a* are offset from each other in the circumferential direction. In this way, the electrical clearance between the connection structures 2145 can be increased, thereby reducing insulation requirements at the connection structures 2145. Moreover, the process complexity can be reduced, raw materials can be saved, and the production line operation rhythm can be improved.

In an exemplary embodiment of the present disclosure, the connection structures 2145 of two adjacent coil units 200*a* in the axial direction are arranged at intervals in the circumferential direction.

In an exemplary embodiment of the present disclosure, the connection structures 2145 of the coil unit 200*a* located on two sides of one coil unit 200*a* in the axial direction are stacked together in the axial direction, which can maximize the spacing between the connection structures 2145 of two adjacent coil units 200*a* in the circumferential direction.

For example, four coil units 200*a* are provided. The four coil units 200*a* include a first coil unit, a second coil unit, a third coil unit, and a fourth coil unit sequentially in a direction away from the bottom wall of the winding slot 120. The connection structure 2145 between the first coil unit and the second coil unit, the connection structure 2145 between the second coil unit and the third coil unit, and the connection structure 2145 between the third coil unit and the fourth coil unit are arranged at intervals in the circumferential direction. Further, the connection structure 2145 between the first coil unit and the third coil unit, and the connection structure 2145 between the second coil unit and the fourth coil unit are stacked together in the axial direction.

In an exemplary embodiment of the present disclosure, the plurality of connection structures 2145 of each of the coil units 200*a* are evenly distributed in the circumferential direction to increase the spacing of connection structures 2145 of two adjacent coil units 200*a*.

In some embodiments, each of the plurality of first conductors 210 further includes a first connection arm 216 and a second connection arm 217. The first insertion portion 211 is connected to the first pin 214 by the first connection arm 216, and the second pin 215 is connected to the second insertion portion 212 by the second connection arm 217.

In some embodiments, in two adjacent first conductors 210 in the circumferential direction, the second connection arm 217 of one of the two adjacent first conductors 210 passes between the second pin 215 of another one of the two adjacent first conductors 210 and the stator core 100.

In an exemplary embodiment of the present disclosure, the first insertion portion 211 and the second insertion portion 212 of the first conductor 210 are spaced apart from each other in the circumferential direction and connected to each other to form a substantially U-shaped structure. The first insertion portion 211 is one wall part of the U-shaped structure, and the second insertion portion 212 is the other wall part of the U-shaped structure. The first connection arm 216 is formed by extending away from the second insertion portion 212 in the circumferential direction. That is, the first connection arm 216 is formed by extending away from an interior of the U-shaped structure. Similarly, the second connection arm 217 is formed by extending away from the interior of the U-shaped structure.

In an exemplary embodiment of the present disclosure, the first connection arm 216 and the second connection arm 217 are located outside the stator core 100.

In an exemplary embodiment of the present disclosure, the first connection arm 216 and the first insertion portion 211 are integrally formed to improve a connection strength between the first connection arm 216 and the first insertion portion 211. In an exemplary embodiment of the present disclosure, the second connection arm 217 and the second insertion portion 212 are integrally formed to improve a connection strength between the second connection arm 217 and the second insertion portion 212.

In an exemplary embodiment of the present disclosure, the first connection arm 216 and the first pin 214 are integrally formed to improve the connection strength between the first connection arm 216 and the first pin 214. In an exemplary embodiment of the present disclosure, the second connection arm 217 and the second pin 215 are integrally formed to improve the connection strength between the second connection arm 217 and the second pin 215.

In an exemplary embodiment of the present disclosure, the first pin 214 is formed by radially extending an end of the first connection arm 216 facing away from the first insertion portion 211 in a direction away from the center of the stator core 100. In an exemplary embodiment of the present disclosure, the second pin 215 is formed by extending an end of the second connection arm 217 facing away from the second insertion portion 212 in a second direction away from the second insertion portion 212.

In the above technical solution, on the one hand, a position of the first pin 214 can be adjusted by controlling the shape and the dimension of the first connection arm 216, and a position of the second pin 215 can be adjusted by controlling the shape and the dimension of the second connection arm 217. As a result, the first pin 214 and the second pin 215 may be located at suitable positions. The second connection arm 217 of one first conductor 210 passes between the second pin 215 of another first conductor 210 and the stator core 100. That is, the second pin 215 of the other first conductor 210 is located at a side of the second connection arm 217 away from the center of the stator core 100. That is, the second pin 215 is located outside the second connection arms 217 of other first conductors 210. When the first pin 214 and the second pin 215 are connected to each other through the welding, the influence of a high temperature on other components of the first conductor 210 during the welding can be reduced. Meanwhile, it is convenient to perform the welding operation on the first pin 214 and the second pin 215.

Figure 25:
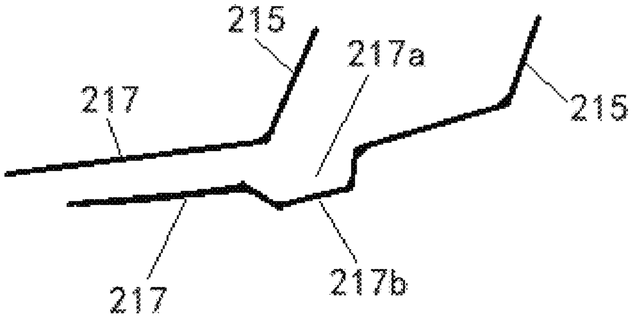
FIG. 25 is a schematic partial structural view of a coil unit of a stator according to some embodiments of the present disclosure.

FIG. 25 is a schematic partial structural view of a coil unit of a stator according to some embodiments of the present disclosure.

In some embodiments, as shown in FIG. 13 to FIG. 25, a side of the second connection arm 217 facing away from the stator core 100 has an avoidance recess 217*a* for avoiding the second pin 215 of another first conductor 210.

In an exemplary embodiment of the present disclosure, the second pin 215 is correspondingly located at a side of the avoidance recess 217*a* facing away from the center of the stator core 100. In an exemplary embodiment of the present disclosure, the second pin 215 is at least partially correspondingly located in the avoidance recess 217*a*.

The avoidance recess 217*a* may have various shapes. When the second pin 215 and the second connection arm 217 are connected in a rounded transition, the avoidance recess 217*a* may be arc-shaped, which on the one hand facilitates machine shaping of the avoidance recess 217*a*, and on the other hand allows the shape of the avoidance recess 217*a* and the connection shape of each of the second pin 215 and the second connection arm 217 to be adapted. In this way, the avoidance recess 217*a* can better avoid the second pin 215.

In the above technical solution, by providing the avoidance recess 217*a* at the second connection arm 217, it is possible to provide the avoidance for the second pin 215, to avoid the second pin 215 from being stacked to the second connection arms 217 of other first conductors 210. As a result, a thickness of the coil unit 200*a* in the axial direction can be reduced. By providing the avoidance recess 217*a*, an end height of the stator winding 200 can be minimized. A dimension of an outer envelope dimension of the stator is relatively small, and the dimension of the motor is smaller, which facilitates the arrangement of the motor. In addition, by providing the avoidance recess 217*a*, an interaction force caused by a positional interference between the second pin 215 and the second connection arm 217 can also be improved, affecting the stability of the position of the second pin 215, which in turn affect the welding strength.

In an exemplary embodiment of the present disclosure, in two adjacent first conductors 210 in the circumferential direction, the first connection arm 216 of one of the two adjacent first conductors 210 passes between the first pin 214 of the other first conductor 210 and the stator core 100. In an exemplary embodiment of the present disclosure, a side of the first connection arm 216 facing away from the stator core 100 has an avoidance recess for avoiding the first pin 214 of the other first conductor 210.

In some embodiments, the second connection arm 217 is bent where the second connection arm 217 corresponds to the avoidance recess 217*a*, and is formed as a protrusion 217*b* protruding towards the stator core 100.

In the above embodiment, by providing the protrusion 217*b* corresponding to the avoidance recesses 217*a*, the second connection arm 217 can be form with the avoidance recess 217*a* and the protrusion 217*b* by bending process, allowing a forming process of the second connection arm 217 to be simple.

In some embodiments, as shown in FIG. 15 to FIG. 20, the first pin 214 and the second pin 215 are formed by radially extend away from the center of the stator core 100.

In the above embodiment, when the first pin 214 and the second pin 215 are formed by radially extending away from the center of the stator core 100, a gap between the first pin 214 and the second pin 215 and components such as the first insertion portion 211 can be increased. When the overlapped first pin 214 and second pin 215 are welded to each other, the influence of the high temperature on other components can be reduced. When the overlapped first pin 214 and second pin 215 are formed by extending towards each other in the circumferential direction, the shape of the first conductor 210 can be simplified, and the dimension of the first conductor 210 can be reduced, thereby reducing the height of the coil unit 200*a* away from the end of the stator core 100. In addition, the dimension of the outer envelope of the stator can be reduced, and the weight of the first conductor 210 can also be reduced, which facilitates the arrangement of the stator. In the above embodiments, the first pin and the second pin can be clamped during the welding, and thus is suitable for mass production.

Figure 26:
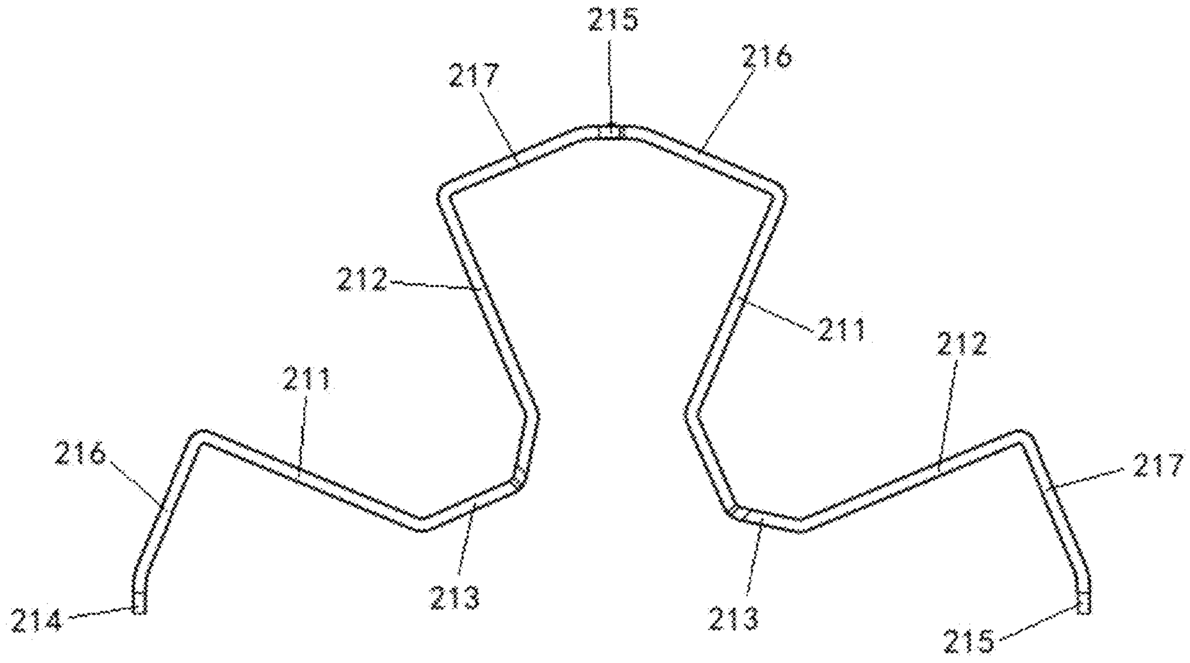
FIG. 26 is a schematic structural view of two first conductors of a stator according to other embodiments of the present disclosure.
Figure 27:
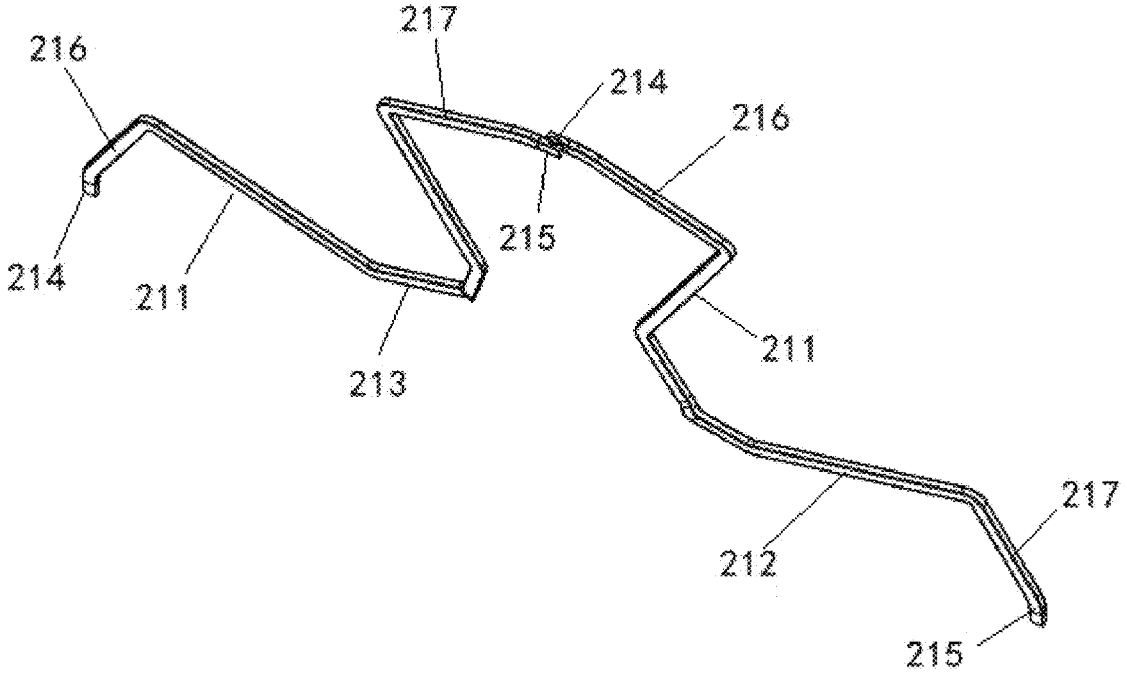
FIG. 27 is a schematic structural view of FIG. 26 in another direction.
Figure 28:
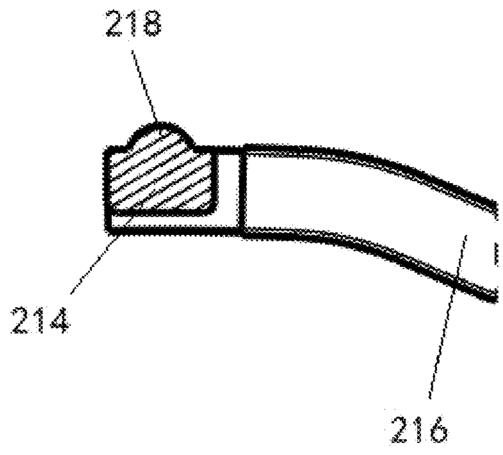
FIG. 28 is a schematic partial structural view of the first conductor of the stator shown in FIG. 13.
Figure 29:
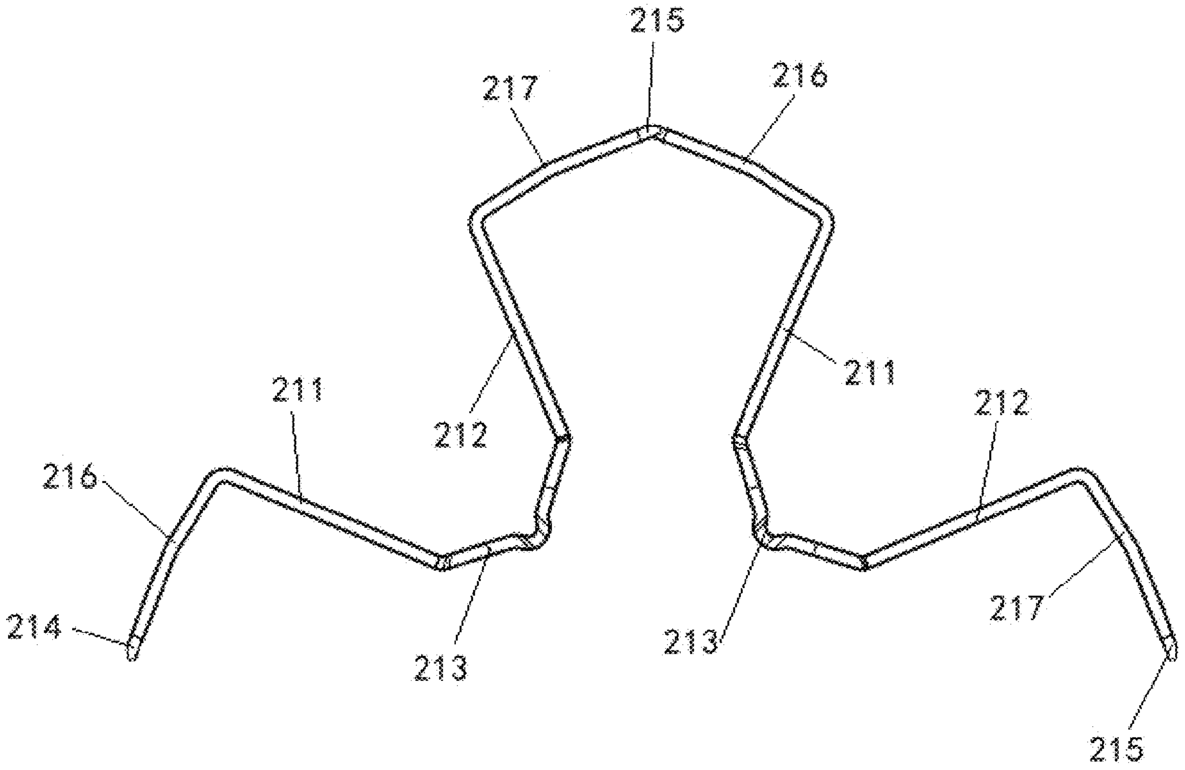
FIG. 29 is a schematic structural view of two first conductors of a stator according to other embodiments of the present disclosure.
Figure 30:
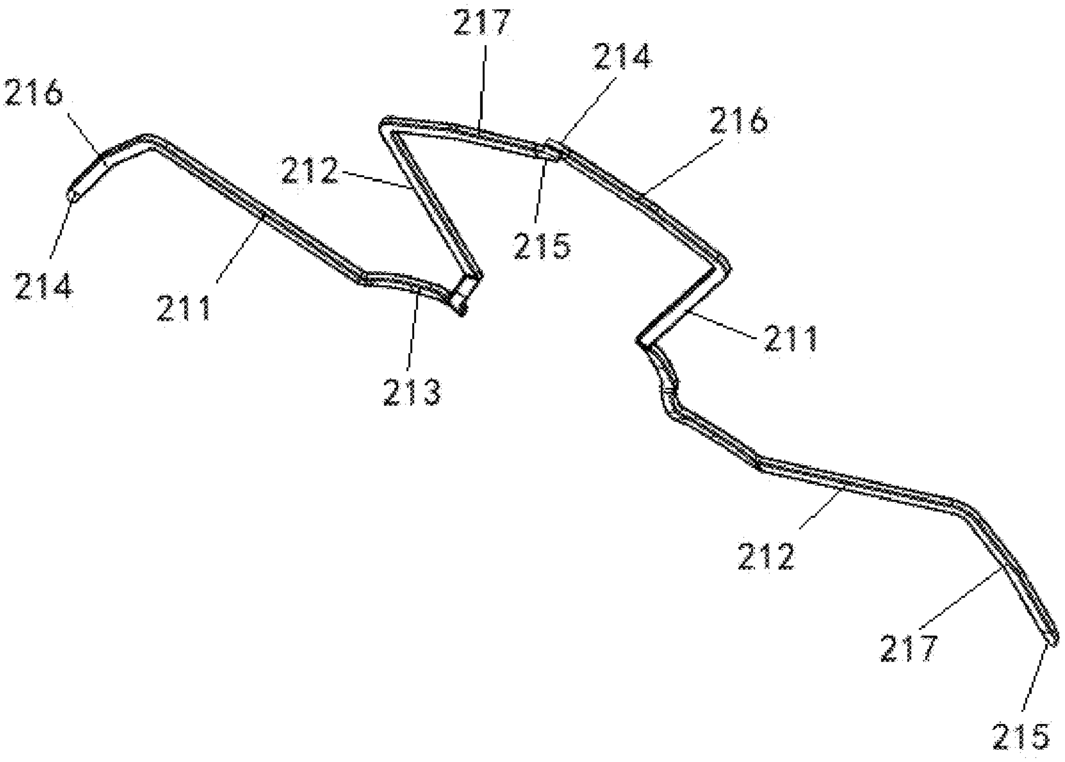
FIG. 30 is a schematic structural view of FIG. 29 in another direction.
Figure 31:
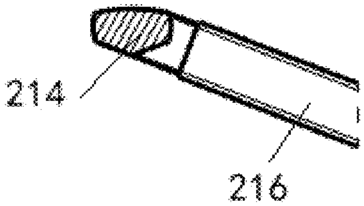
FIG. 31 is a schematic partial structural view of the first conductor of the stator shown in FIG. 29.

FIG. 26 is a schematic structural view of two first conductors of a stator according to other embodiments of the present disclosure. FIG. 27 is a schematic structural view of FIG. 26 in another direction. FIG. 28 is a schematic partial structural view of the first conductors of the stator shown in FIG. 26. FIG. 29 is a schematic structural view of two first conductors of a stator according to other embodiments of the present disclosure. FIG. 30 is a schematic structural view of FIG. 29 in another direction. FIG. 31 is a schematic partial structural view of the first conductors of the stator shown in FIG. 29.

In other embodiments, as shown in FIG. 26 to FIG. 31, the overlapped first pin 214 and second pin 215 are formed by extending towards each other in the circumferential direction.

In the embodiments of the present disclosure, the shape of the first conductor 210 can be simplified, thereby reducing the dimension of the first conductor 210 and the height of the coil unit 200*a* away from the end of the stator core 100. Therefore, the dimension of the outer envelope of the stator can be reduced, and the weight of the first conductor 210 can also be reduced, which facilitates the arrangement of the stator.

In some embodiments, when the overlapped first pin 214 and second pin 215 are formed by extending towards each other in the circumferential direction, the first pin 214 and the second pin 215 may overlap to each other with circumferential overlapping, cross overlapping, and other structural forms. The first pin 214 and the second pin 215 may directly overlap with each other, or in an exemplary embodiment of the present disclosure, as shown in FIG. 26 to FIG. 28, the first pin 214 and the second pin 215 are provided with welding protrusions 218. The welding protrusion 218 is formed by protruding away from the center of the stator core 100. An orthographic projection of the welding protrusion 218 in the axial direction may has a semicircular shape or a polygonal shape. The welding protrusions 218 of the first pin 214 and the second pin 215 are stacked together in the axial direction. During a manufacturing stage of the stator, the welding protrusions 218 of the first pin 214 and the second pin 215 may be clamped at an overlapping position and then connected to each other through the welding. The welding may be laser or argon arc welding. By directly overlapping the first pin 214 and the second pin 215 in the circumferential direction, a radial space of the stator can be saved. As a result, the end height of the coil unit 200*a* can be suppressed to be lower, and the dimension of the outer envelope of the stator and the weight of the stator can be reduced.

Figure 32:
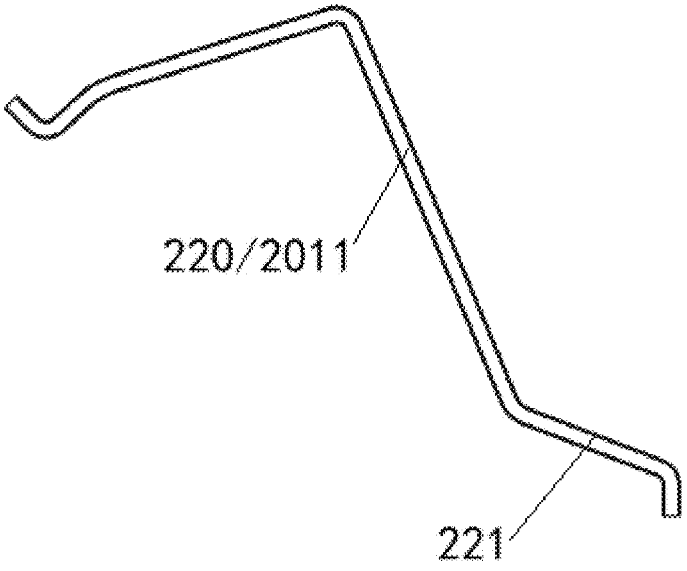
FIG. 32 is a schematic structural view of a second conductor of a stator according to some embodiments of the present disclosure.

FIG. 32 is a schematic structural view of a second conductor 220 of a stator according to some embodiments of the present disclosure.

As shown in FIG. 32, the coil unit further includes a second conductor 220. The second conductor 220 includes one insertion portion 2011 inserted into the winding slot 120, which can simplify a structure of the second conductor 220 and facilitate the manufacturing of the second conductor 220.

In an exemplary embodiment of the present disclosure, the second conductor 220 includes an insertion portion 2011 and a connection section 221. The insertion portion 2011 and the connection section 221 are integrally formed to have an I-shaped structure. The insertion portion 2011 and the connection section 221 are distributed sequentially in an extending direction of the I-shape structure. The two second conductors 220 are connected to each other by the connection section 221 to form a similar shape to the first conductor 210.

In some embodiments, the coil unit may only include the first conductor 210.

Figure 33:
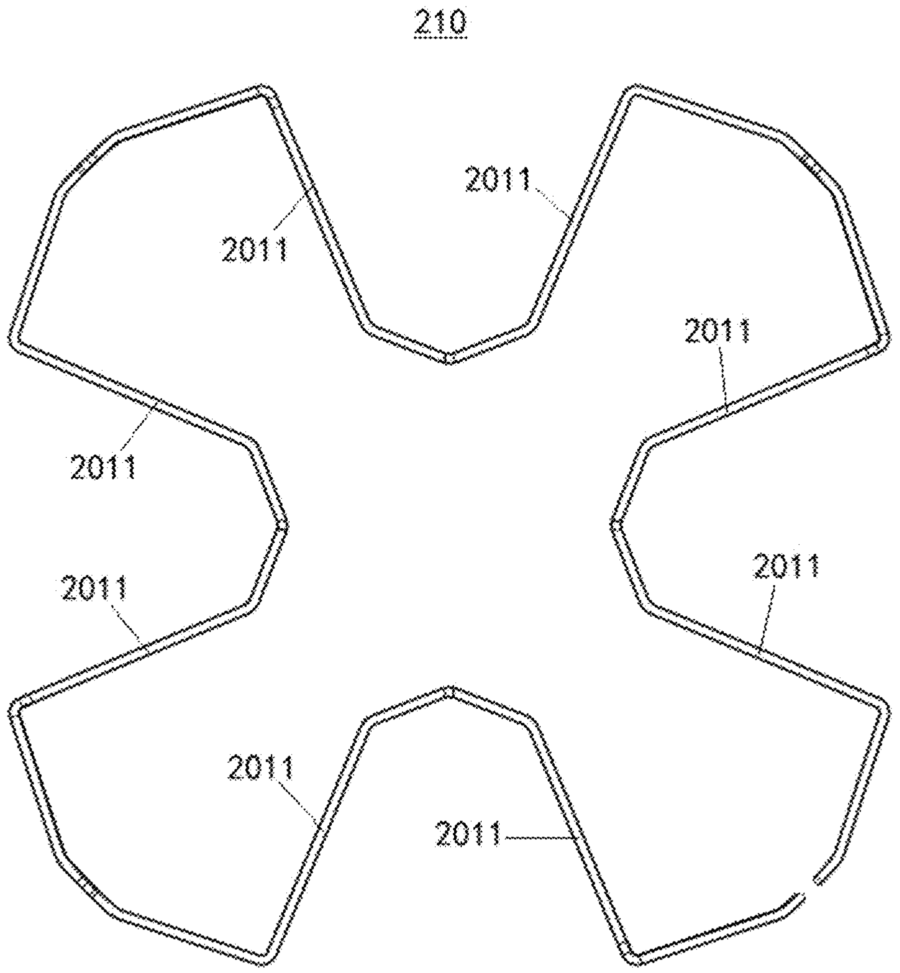
FIG. 33 is a schematic structural view of another first conductor of a stator according to some embodiments of the present disclosure.
Figure 34:
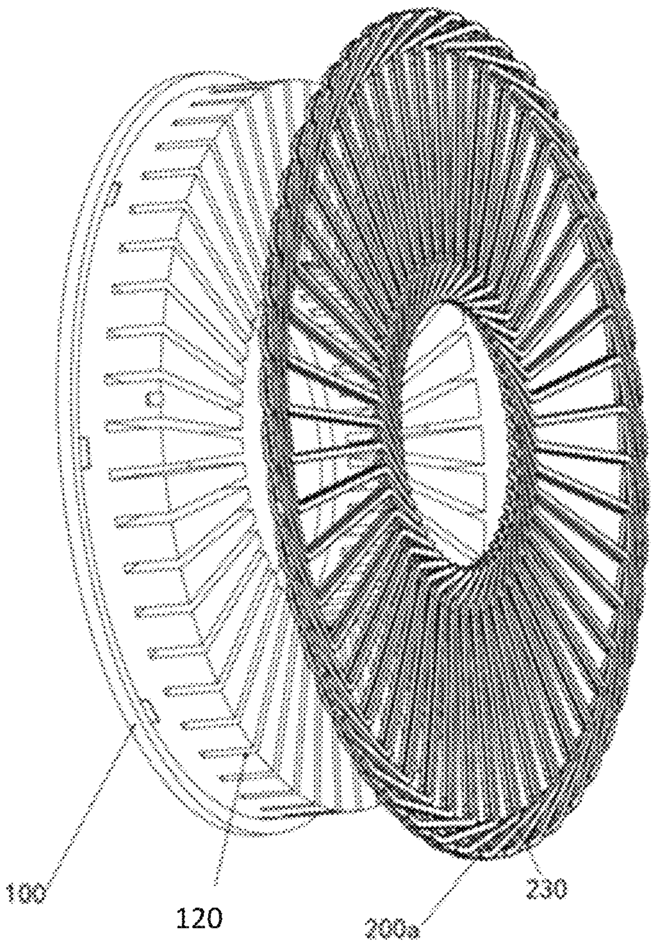
FIG. 34 is a schematic structural view of a stator including the first conductor shown in FIG. 33.

FIG. 33 is a schematic structural view of another first conductor 210 of a stator according to some embodiments of the present disclosure. FIG. 34 is a schematic structural view of a stator including the first conductor 210 shown in FIG. 33.

In some embodiments, as shown in FIG. 33 and FIG. 34, each of the plurality of first conductors 210 includes one insertion portion 2011, or each of the plurality of first conductors 210 is bent continuously and includes at least three insertion portions 2011. The at least three insertion portions 2011 of each of the plurality of first conductors 210 are inserted into different winding slots 120, respectively.

In the above embodiment, more than three insertion portions 2011 of one first conductor 210 are inserted into different winding slots 120 respectively. In this way, the contact area between the first conductor 210 and the stator core 100 can increased, thereby improving the stability of the relative position between the first conductor 210 and the stator core 100.

In an exemplary embodiment of the present disclosure, the first conductor 210 may include eight insertion portions 2011.

In the embodiments of the present disclosure, a combination of the first conductor 210 and the second conductor 220 may have different forms, which can reduce the number of types of preformed distributed coil units 200*a*, lower process complexity, and minimize mold investment costs.

In some embodiments, the first insertion portion 211 and the second insertion portion 212 of one first conductor 210 are arranged symmetrically.

In an exemplary embodiment of the present disclosure, when the first conductor 210 includes the first pin 214 and the second pin 215, the first pin 214 and the first insertion portion 211 of one first conductor 210 are arranged symmetrically with the second pin 215 and the second insertion portion 212 of the one first conductor 210.

In an exemplary embodiment of the present disclosure, when the first conductor 210 includes the first pin 214, the first connection arm 216, the second pin 215, and the second connection arm 217, the first pin 214, the first connection arm 216, and the first insertion portion 211 of one first conductor 210 are arranged symmetrically with the second pin 215, the second connection arm 217, and the second insertion portion 212 of the one first conductor 210.

In the above technical solution, by symmetrically arranging the first insertion portion 211 and the second insertion portion 212, a force to which the first conductors 210 is subject can be balanced, thereby allowing for more stable relative positions among the plurality of first conductors 210 that are inserted and embedded.

Figure 35:
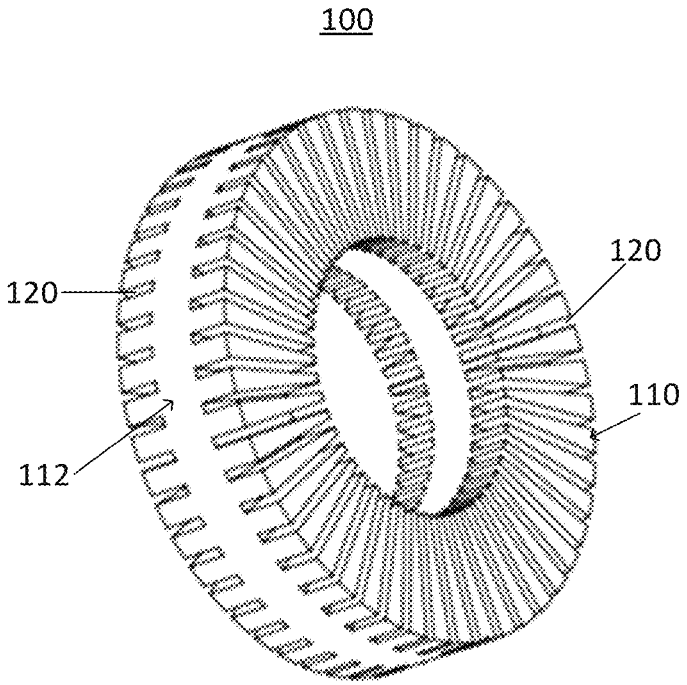
FIG. 35 is a schematic view of a stator core of a stator according to other embodiments of the present disclosure.
Figure 36:
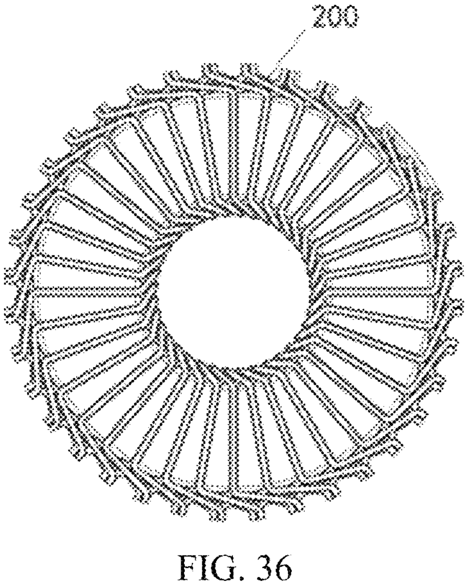
FIG. 36 is a schematic view of a stator according to other embodiments of the present disclosure.
Figure 37:
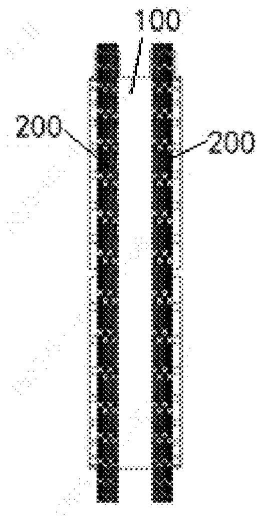
FIG. 37 is a side view of the stator shown in FIG. 36.

FIG. 35 is a schematic view of a stator core of a stator according to other embodiments of the present disclosure. FIG. 36 is a schematic view of a stator according to other embodiments of the present disclosure. FIG. 37 is a side view of the stator shown in FIG. 36.

In some embodiments, referring to FIG. 35 to FIG. 37, two end surfaces 110 of the stator core 100 in the axial direction of the stator core 100 both have the plurality of winding slots 120.

In the above embodiment, by forming the plurality of winding slots 120 at two sides of the stator core 100 in the axial direction thereof, the stator windings 200 can be embedded at different sides of the stator core 100, and one stator core 100 can accommodate more coil units 200*a*.

Figure 38:
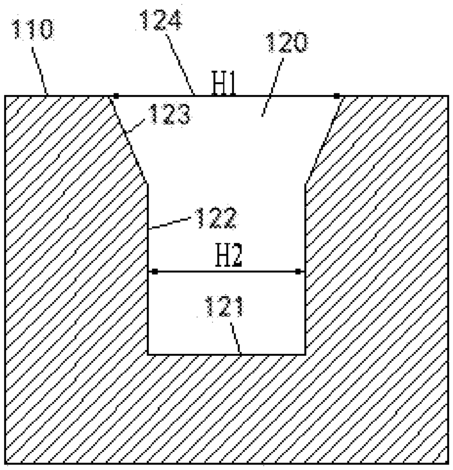
FIG. 38 is a partial cross-sectional view of a stator core of a stator according to some embodiments of the present disclosure.

FIG. 38 is a partial cross-sectional view of a stator core of a stator according to some embodiments of the present disclosure.

In some embodiments, as shown in FIG. 38, each of the plurality of winding slots 120 includes a bottom wall surface 121, two side wall surfaces 122 connected to the bottom wall surface 121, and two inclined surfaces 123 respectively connected to the two side wall surfaces 122. The two side wall surfaces 122 are spaced apart from each other in the circumferential direction. A slot opening 124 is formed between ends of the two inclined surfaces 123 facing away from the respective side wall surfaces 122.

In the above embodiment, by connecting the inclined surface 123 to the side wall surface 122, a dimension of the slot opening 124 can be increased, thereby facilitating embedding the coil unit 200*a* in the winding slots 120.

In some embodiments, a dimension of the slot opening 124 in the circumferential direction is H1, and a spacing between the two side wall surfaces 122 in the circumferential direction is H2, where H1≥1.5 H2.

In the above technical solution, an extending dimension of the slot opening 124 in the circumferential direction is relative greater, and is greater than 1.5 times the spacing between the two side wall surfaces 122 in the circumferential direction. In this way, the coil unit 200*a* can be easily inserted into the winding slots 120, and thus the efficiency of embedding the coil unit 200*a* into the winding slots 120 can be improved.

Figure 39:
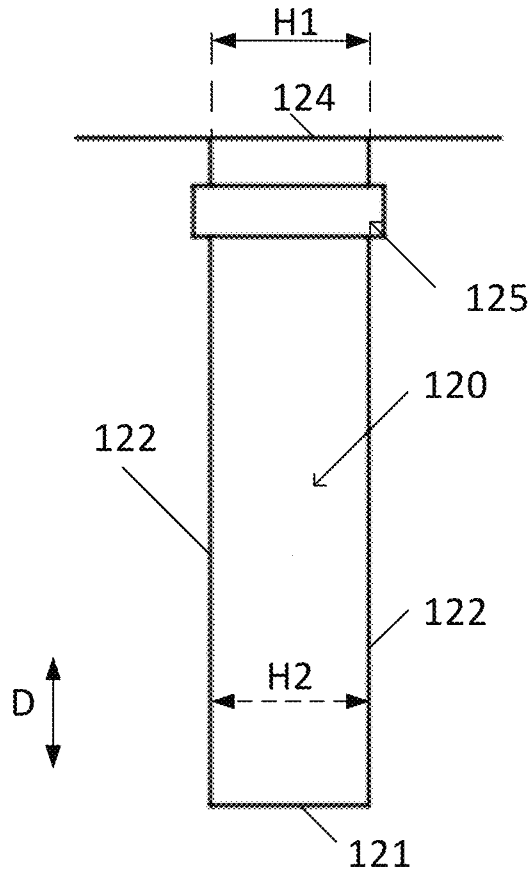
FIG. 39 is a partial cross-sectional view of a stator core of a stator according to other embodiments of the present disclosure.

FIG. 39 is a partial cross-sectional view of a stator core of a stator according to other embodiments of the present disclosure.

As shown in FIG. 39, in some embodiments, a slot surface of each of the plurality of winding slots 120 includes a bottom wall surface 121 and two side wall surfaces 122 connected to the bottom wall surface 121. The two side wall surfaces 122 are spaced apart from each other in the circumferential direction. The plurality of insertion portions 2011 are arranged between the two side wall surfaces 122. Each of the plurality of winding slots 120 has a slot opening 124 located at an end of the winding slot 120 in the axial direction D, and the slot opening 124 is opposite to the bottom wall surface 121 in the axial direction D. A dimension of the slot opening 124 in the circumferential direction of the stator core is H1, and a spacing between the two side wall surfaces 122 in the circumferential direction of the stator core is H2, where H1≤H2.

In the embodiments of the present disclosure, the slot opening 124 may be smaller than or equal to a slot width of the winding slot 120. In this way, a reserved space for assembling predetermined distributed windings and gaps between the conductors can be greatly reduced, allowing a copper fullness rate to reach more than 75%. Meanwhile, the wire is embedded in the axial direction, which can provide a convenient and efficient wire embedding process.

In another exemplary embodiment of the present disclosure, H1 is smaller than H2.

In some embodiments, referring to FIG. 11 and FIG. 39, each of the plurality of winding slots 120 includes a mounting slot 125, and the mounting slot 125 is formed as a recess on the side wall surface 122. The stator further includes a limit member 300. The limit member 300 is inserted into the mounting slot 125. The limit member 300 is configured to limit movements of the plurality of insertion portions 2011 in the axial direction D.

By forming the mounting slot 125 and the limit member 300, the risk of separation of insertion portions 2011 out of the winding slots 120 can be reduced.

In some embodiments, the limit member 300 may be an insulation member. The limit member 300 can reinforce the insulation performance of the stator winding 200 at the slot opening. The limit member 300 also provides dual functions of insulation reinforcement and space limitation in the stator.

In other embodiments, the limit member 300 may be a magnetic member. After the motor employs the magnetic limit member 300, an excitation current can be moderately reduced, a power factor can be improved, and motor efficiency can be improved. By reducing iron core loss, the motor temperature rise can be reduced, and electromagnetic noise and vibration can be reduced. As the magnetic limit member 300 is a magnetic conductor, magnetic leakage of the motor can be enhanced, and thus the starting torque can be decreased.

In another exemplary embodiment of the present disclosure, the limit member 300 may be inserted into the mounting slot 125 from the outer wall and pushed into the mounting slot 125 towards the inner wall to close the slot opening 124 of the winding slot 120.

In an exemplary embodiment of the present disclosure, when a plurality of coil units 200*a* is provided, the coil units 200*a* may be sequentially stacked into the winding slots 120 through the slot openings 124 of the winding slots 120. In another embodiment, the plurality of coil units 200*a* may be stacked into the winding slots 120 as a whole through the slot openings 124 of the winding slots 120. In the stator according to the embodiments of the present disclosure, the coil unit 200*a* has a simple structure, the wire embedding method is convenient and simple, and automatic production can be easily realized.

In an exemplary embodiment of the present disclosure, the number of the winding slots 120 in the stator core 100 and the number of the first conductors 210 may be adjusted as desired. The embodiments of the present disclosure will be described below by taking 48 winding slots 120 as an example. The 48 winding slots 120 are evenly distributed at the stator core 100 in the circumferential direction. During the wire embedding of the coil unit 200*a*, i.e., during the arrangement of the coil unit 200*a* in the winding slots 120, one first conductor 210 may be stacked in the winding slot 120 each time until the 42nd first conductor 210 is stacked in the winding slot 120. The 43rd to 48th first conductors 210 may be inserted through the slot openings 124 of the winding slots 120 as a whole by means of robot clamping until the 43rd to 48th first conductors 210 are attached to the first conductors 210 located in the winding slots 120. After one coil unit 200*a* has been embedded, the second coil unit 200*a* and the third coil unit 200*a* are sequentially embedded.

In an exemplary embodiment of the present disclosure, the stator core 100 may be selected from the winding-formed stator core 100, which can improve the problem of wastage of edges and intermediate cylindrical materials in the conventional process. The waste materials only include materials corresponding to the winding slots 120, i.e., the materials removed to form the winding slots 120. Therefore, the utilization rate of the materials can be improved. Moreover, the stator core 100 has a simple forming process, and thus automation can be easily realized.

In an exemplary embodiment of the present disclosure, the stator core 100 is die-cast formed from composite materials such as sheet molding plastic materials with high magnetic permeability and low loss. As a result, the stator core 100 can be easily formed and has a simple heat treatment process.

In an exemplary embodiment of the present disclosure, the stator core 100 may also be assembled using split iron cores. In this way, the stator core 100 has a higher dimension and precision, stable quality, and high production efficiency. Meanwhile, the material utilization is high, and material costs can be lowered.

In an exemplary embodiment of the present disclosure, the stator core 100 may be slotted at one side or at two sides. That is, the winding slots 120 are formed at one side or two sides of the stator core 100 in the axial direction. In this way, single-side or double-side wire embedding can be implemented for the coil unit 200*a*. In the single-side slotted wire embedding method of the stator core 100, the stator core 100 has a yoke part to facilitate mounting and fixing of the stator. The double-sided slotted wire embedding method of the stator core 100 has technical advantages such as improved material utilization rate, motor efficiency, and power density, and reduced weight and volume.

The stator according to the embodiments of the present disclosure is suitable for motors with different numbers of phases, and thus may be adapted to different voltages and power ranges.

In some embodiments, the stator winding 200 includes three phase windings. The three windings include a first phase winding, a second phase winding, and a third phase winding. In an exemplary embodiment of the present disclosure, the first phase winding is a U-phase winding, the second phase winding is a V-phase winding, and the third phase winding is a W-phase winding.

Each of the phase windings may include only one branch or a plurality of branches. The branches of the phase windings may also be referred to as parallel branches.

The number of the branches of the phase winding may be any integer number to expand the use range of the winding design and adapt to different voltages and power ranges.

In some embodiments, the stator windings 200 may be connected into a full-pitch winding, a short-pitch winding, or a multi-layer winding.

In an exemplary embodiment of the present disclosure, when the stator winding 200 is a three-phase stator winding, there are various three-phase distribution forms in each of the winding slots 120, such as a structure of 12 poles and 36 winding slots with the number of the winding slots per pole per phase Q being 1. Taking 12 poles as an example, 36, 72 or more winding slots 120 may be provided. By adjusting the number of the winding slots Q, harmonics of different orders may be eliminated or even reduced by 5, 7, 11, and 13 orders for example, thereby reducing torque ripple and improving NVH.

Embodiments of the present disclosure also provide a motor including a rotor and the stator according to any one of the above embodiments. The rotor is arranged in a space defined by the inner wall of the stator core 100.

The motor according to the embodiments of the present disclosure may be a generator or an electrical motor.

Embodiments of the present disclosure also provide a power assembly including a speed reducer and the above-mentioned motor. The motor is in a transmission connection with the speed reducer. In an exemplary embodiment of the present disclosure, a drive shaft of the motor may be in the transmission connection with an input shaft of the speed reducer by a transmission member such as a coupling to output a driving force to the speed reducer from a flat wire motor.

Embodiments of the present disclosure also provide a vehicle including the above-mentioned power assembly. The above-mentioned power assembly is provided in the vehicle, and is configured to supply operation power to the vehicle. In an exemplary embodiment of the present disclosure, the vehicle may be a new energy vehicle driven by electric energy, for example. The new energy vehicle may for example be a hybrid electric vehicle, a pure electric vehicle, or a fuel cell electric vehicle, etc., or a vehicle that employs a high-efficiency energy storage device such as a supercapacitor, a flywheel battery, or a flywheel storage device, as a source of the electric energy.

Figure 40:
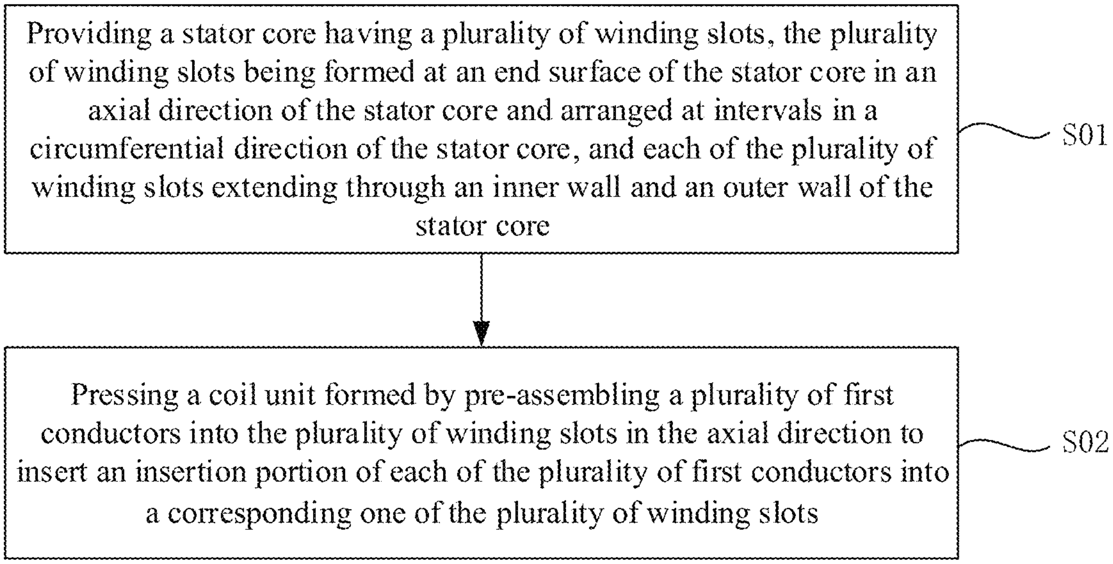
FIG. 40 is a schematic flow diagram of a manufacturing method of a stator according to some embodiments of the present disclosure.

FIG. 40 is a schematic flow diagram of a manufacturing method of a stator according to some embodiments of the present disclosure.

Referring to FIG. 40, embodiments of the present disclosure further provide a manufacturing method of a stator. The manufacturing method includes operations at blocks S01 and S02. At block S01, a stator core 100 having a plurality of winding slots 120 is provided. The plurality of winding slots 120 is formed at an end surface of the stator core 100 in an axial direction D of the stator core 100, and is arranged at intervals in a circumferential direction of the stator core 100. Each of the plurality of winding slots 120 extends through an inner wall 111 and an outer wall 112 of the stator core 100. At block S02, a coil unit 200*a* formed by pre-assembling a plurality of first conductors 210 is pressed into the plurality of winding slots 120 in the axial direction D to insert an insertion portion 2011 of each of the plurality of first conductors 210 into a corresponding one of the plurality of winding slots 120.

In the present embodiment, the stator core having a plurality of winding slots is first provided, and then after assembling the plurality of first conductors into the coil unit, the pre-assembled coil unit is embedded into the winding slots as a whole. In this way, the assembly efficiency of the stator can be effectively improved as compared with inserting the plurality of first conductors into the winding slots one by one.

In some embodiments, before the operation at block S02, the manufacturing method further includes: providing a conductor of a linear shape, the conductor including a wire and an insulation coating wrapping around the wire; removing the insulation coating at two ends of the conductor; and bending the conductor to form the first conductor including a plurality of insertion portions arranged at intervals.

In the above technical solution, the first conductor is formed by directly bending the conductor of the linear shape after removing the insulation coating at two ends of the conductor without performing conductor cutting and other processes in the later stage, which can lower complexity of the manufacturing process of the conductor and improve the manufacturing efficiency of the stator.

In some embodiments, the stator has a pole number of 2p and a pole pitch that is n winding slots.

The manufacturing method further includes, prior to the operation at block S02: providing 2p×n first conductors. Each of the 2p×n first conductors includes a first insertion portion and a second insertion portion, and a span between the first insertion portion and the second insertion portion is n winding slots.

Pre-assembling the plurality of first conductors into the coil unit includes: providing an assembly mechanism including 2p×n grooves, the 2p×n grooves being evenly arranged in a circumferential direction of the assembly mechanism; stacking (2p−1)×n first conductors at the 2p×n grooves sequentially in a counterclockwise direction; and inserting remaining n first conductors into the grooves of the assembly mechanism to form the coil unit. In one of the grooves, the first insertion portion of one first conductor of the coil unit is located at a side of the second insertion portion of another first conductor of the coil unit close to a bottom wall of the groove.

In some embodiments, the manufacturing method further includes: removing the pre-assembled coil unit from the assembly mechanism. The operation at block S02 may be performed after the coil unit is removed from the apparatus mechanism. In the above technical solution, the span between the first insertion portion and the second insertion portion is equal to the pole pitch, which can simplify the winding structure of the first conductor. In one of the plurality of winding slots, the first insertion portion of the first conductor is closer to the bottom wall of the winding slot, allowing the plurality of first conductors to be sequentially woven, stacked, and embedded to form a coil unit with two winding layers. The first insertion portion of the first conductor is located at one of the two winding layers, and the second insertion portion is located at another winding layer. The plurality of first conductors can be embedded with each other and limited by each other, thereby improving the stability of relative positions among the plurality of first conductors of the coil unit.

FIG. 41 to FIG. 46 are different schematic views of stators according to other embodiments of the present disclosure during manufacturing.

Figure 41:
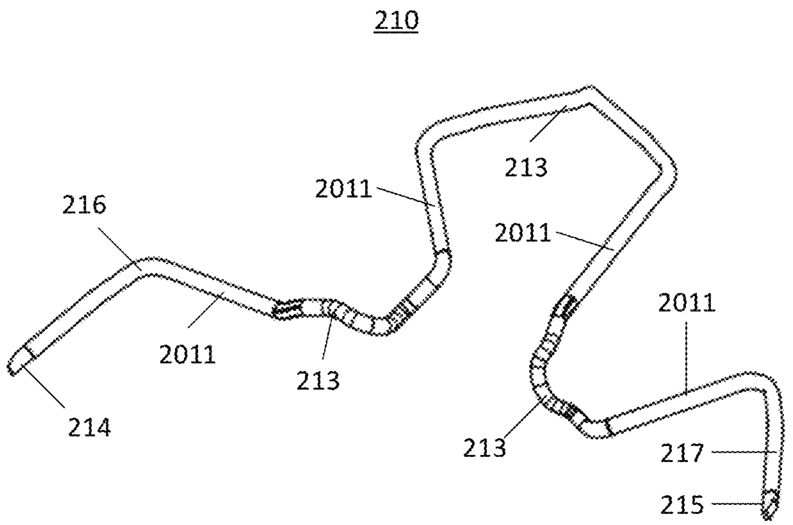
FIG. 41 to FIG. 46 are different schematic views of a stator according to other embodiments of the present disclosure during manufacturing.
Figure 42:
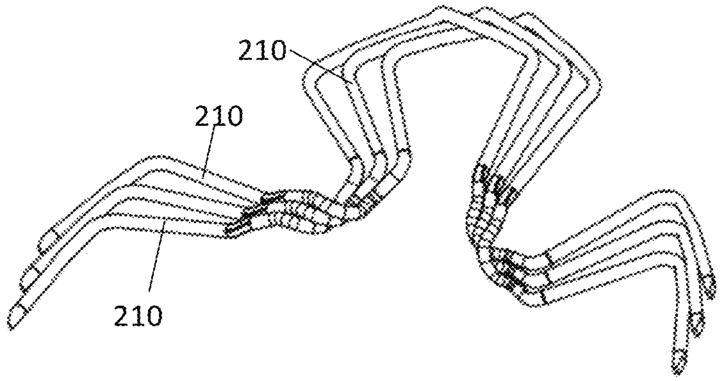
Figure 43:
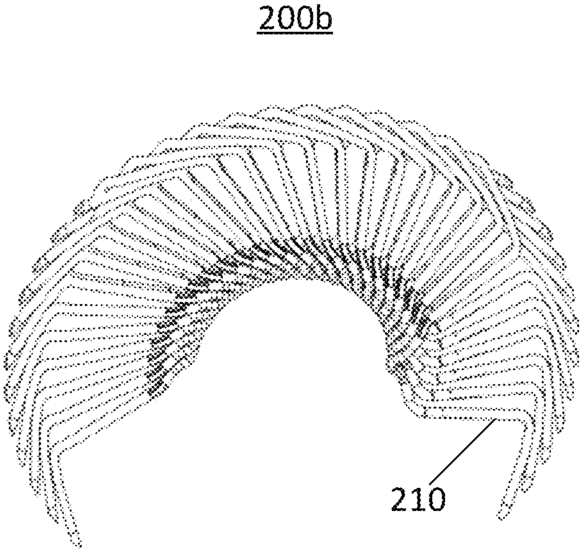
Figure 44:
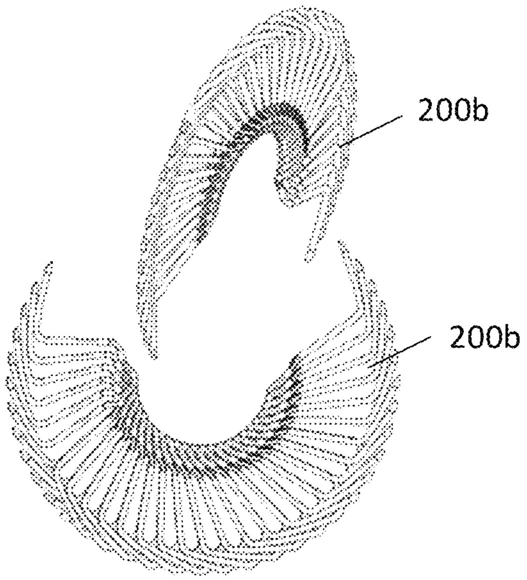
Figure 45:
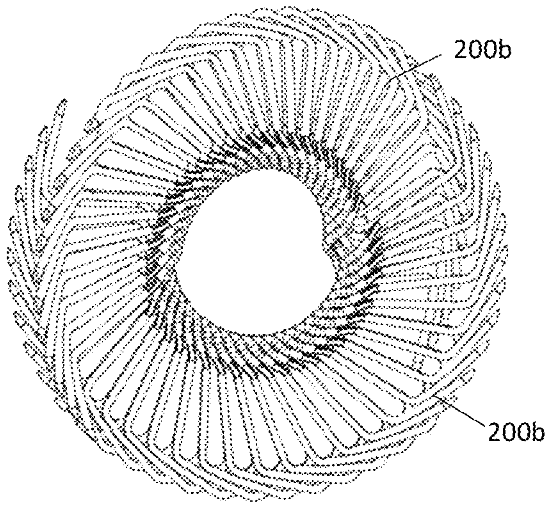
Figure 46:
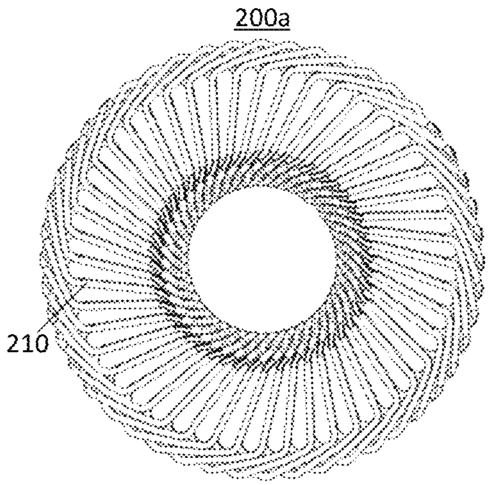

Referring to FIG. 41 to FIG. 47, prior to the operation at block S02, the manufacturing method according to the embodiments of the present disclosure further includes operation at blocks S03 to S05. As shown in FIG. 41, at the block S03, m×j first conductors 210 are provided. Each of the first conductors 210 is continuously bent and includes 2×k insertion portions 2011, where m, j, and k are positive integers. At block S04, as shown in FIG. 42 and FIG. 43, m first conductors 210 of the m×j first conductors 210 is braided into j sub-coil units 200*b*. At block S05, as shown in FIG. 44 to FIG. 46, the j sub-coil units 200*b* is assembled to form the coil unit 200*a*.

At block S03, each of the first conductors 210 may include two, four, six, eight, or sixteen insertion portions 2011. For example, the first conductor 210 includes four insertion portions 2011.

For example, at block S04, as shown in FIG. 42, the first conductors 210 are braided together sequentially. The sub-coil unit 200*b* as shown in FIG. 43 is formed after the m first conductors 210 are braided.

For example, j sub-coil units 200*b* may be assembled to form the coil unit 200*a* through operations such as pair insertion and flipping.

Braiding the plurality of first conductors 210 in steps can reduce the difficulty of braiding and improve the assembly efficiency.

In some embodiments, j is 2. At block S04, two "crescent-shaped" sub-coil units 200*b* may be braided first.

According to some embodiments of the present disclosure, referring to FIG. 1 to FIG. 12, a stator includes a stator core 100 and a stator winding 200. The stator core 100 has a plurality of winding slots 120. The plurality of winding slots 120 is formed at an end surface 110 of the stator core 100 in an axial direction D of the stator core 100, and is arranged at intervals in a circumferential direction of the stator core 100. Each of the plurality of winding slots 120 extends through an inner wall 111 and an outer wall 112 of the stator core 100. An extending direction of the plurality of winding slots 120 is inclined relative to a radial direction of the stator core 100.

The stator winding 200 includes a plurality of coil units 200*a* stacked together in the axial direction D. Each of the coil units 200*a* includes a plurality of first conductors 210 assembled together.

The first conductor 210 is bent continuously and includes four insertion portions 2011, three connection portions 213, a first pin 214, a second pin 215, a first connection arm 216, and a second connection arm 217.

The four insertion portions 2011 are respectively inserted into different winding slots 120, and are arranged in the circumferential direction. Two adjacent insertion portions 2011 are connected to each other by one connection portion 213. The connection portion 213 located inside the inner wall 111 is bent to position the two insertion portions 2011 connected to the connection portion 213 at different layers.

Two connection portions 213 are located inside the inner wall 111. All the connection portions 213 of the coil unit 200*a* located inside the inner wall 111 are arranged in the circumferential direction.

The first pin 214 and the second pin 215 are located at two ends of the first conductor 210. The first pin 214 is connected to one insertion portion 2011 by the first connection arm 216, and the second pin 215 is connected to another insertion portion 2011 by the second connection arm 217.

The first pin 214, the second pin 215, the first connection arm 216, and the second connection arm are all located outside the outer wall 112.

The coil unit 200*a* includes a plurality of conductive branches 201, and each of the conductive branches 201 includes several first conductors 210 connected in series. In two adjacent first conductors 210 of the conductive branch 201, the first pin 214 of one of the first conductors 210 and the second pin 215 of another first conductor 210 are welded to each other to form the connection structure 2145.

All the connection structures 2145 of the coil unit 200*a* are arranged at intervals in the circumferential direction. The connection structures 2145 of two adjacent coil units 200*a* of the plurality of coil units 200*a* are offset from each other in the circumferential direction.

It should be noted that the embodiments and the features in the embodiments in the present disclosure may be combined with each other without conflict.

Finally, it should be noted that the above embodiments are only used to illustrate the technical solutions of the present disclosure, rather than limiting the technical solutions. Although the present disclosure has been described in detail with reference to the above embodiments, those of ordinary skill in the art should understand that modifications may be made to the technical solutions described in the above embodiments, or equivalent substitutions may be made to some of the technical features. However, these modifications or substitutions do not cause the essence of the corresponding technical solutions to depart from the spirit and scope of the technical solutions in the embodiments of the present disclosure.

What is claimed is:

1. A stator of a motor, the stator comprising:

a stator core having a plurality of winding slots, the plurality of winding slots being formed at an end surface of the stator core in an axial direction of the stator core and arranged at intervals in a circumferential direction of the stator core, each of the plurality of winding slots extending through an inner wall and an outer wall of the stator core; and a stator winding comprising at least one coil unit, each of the at least coil unit comprising a plurality of first conductors assembled together, each of the plurality of first conductors comprising at least one insertion portion inserted into a corresponding one of the plurality of winding slots;

wherein:

one of the plurality of first conductors comprises a wire and an insulation layer wrapping around the wire;

an end of the insulation layer has a first opening, and the wire comprises a first pin extending out through the first opening;

the first opening has a first edge close to the outer wall and a second edge facing away from the outer wall, in an extending direction of the first pin, and a distance between the first edge and an end of the first pin is smaller than or equal to a distance between the second edge and the end of the first pin; and an angle between a plane where the first opening is located and a virtual plane ranges from 0° to 30°, the virtual plane being perpendicular to the extending direction of the first pin and passing through the second edge.

2. The stator according to claim 1, wherein:

at least two of the plurality of first conductors of the coil unit are offset from each other in the circumferential direction of the stator;

each of the plurality of first conductors comprises a plurality of insertion portions respectively inserted into different winding slots of the plurality of winding slots; and the stator winding is provided with at least two insertion portions stacked together in the axial direction of the stator core in each of the plurality of winding slots.

3. The stator according to claim 2, wherein:

the coil unit comprises a plurality of conductive branches, each of the plurality of conductive branches comprising several first conductors connected in series;

two adjacent first conductors of each of the plurality of conductive branches are connected to each other to form a connection structure; and all the connection structures of the coil unit are arranged outside of the outer wall.

4. The stator according to claim 3, wherein:

each of the plurality of first conductors is provided with the first pin and a second pin at two ends of the first conductor; and in two adjacent first conductors of each of the plurality of conductive branches, the first pin of one of the two adjacent first conductors and the second pin of another one of the two adjacent first conductors are connected to each other to form the connection structure.

5. The stator according to claim 4, wherein:

in two adjacent first conductors of each of the plurality of conductive branches, the first pin of one of the two adjacent first conductors and the second pin of another one of the two adjacent first conductors overlap with each other in the axial direction of the stator core; and the first pin and the second pin are welded to each other to form the connection structure in an overlapping region.

6. The stator according to claim 4, wherein:

the coil unit is one of a plurality of coil units of the stator winding that are stacked together in the axial direction of the stator core;

all the connection structures of each of the plurality of coil units are arranged at intervals in the circumferential direction of the stator core; and in two adjacent coil units of the plurality of coils units, at least one connection structure of one of the two adjacent coil units and the connection structure of another one of the two adjacent coil units are offset from each other in the circumferential direction of the stator core.

7. The stator according to claim 4, wherein:

the first pin and the second pin are radially extending away from the center of the stator core; or the first pin and the second pin overlap with each other are extending towards each other in the circumferential direction of the stator core.

8. The stator according to claim 4, wherein:

each of the plurality of first conductors further comprises a first connection arm and a second connection arm;

the first pin is connected to one of the two adjacent insertion portions by the first connection arm; and the second pin is connected to another one of the two insertion portions by the second connection arm.

9. The stator according to claim 8, wherein:

the stator winding comprises a plurality of coil units stacked together in the axial direction of the stator core;

in two adjacent coil units of the plurality of coil units, the first connection arm and the second connection arm of at least one first conductor of one of the two adjacent coil units are folded away from another one of the two adjacent coil units;

in two adjacent first conductors in the circumferential direction of the stator core, the second connection arm of one of the two adjacent first conductors passes between the second pin of another one of the two adjacent first conductors and the stator core;

a side of the second connection arm facing away from the stator core has an avoidance recess for avoiding the second pin of the other first conductor; and the second connection arm is bent where the second connection arm corresponds to the avoidance recess, and is formed as a protrusion protruding towards the stator core.

10. The stator according to claim 2, wherein:

each of the plurality of first conductors further comprises at least one connection portion;

adjacent insertion portions are connected to each other by the connection portion; and the at least one connection portion is located at an inner side of the inner wall.

11. The stator according to claim 10, wherein the at least one connection portion located at the inner side of the inner wall is folded in the axial direction, to position two insertion portions connected to the folded connection portion at different layers.

12. The stator according to claim 11, wherein in the axial direction of the stator core, a maximum dimension of each of the at least one connection portion is greater than a total dimension of the two insertion portions.

13. The stator according to claim 11, wherein all the connection portions located at the inner side of the inner wall are arranged in the circumferential direction of the stator core.

14. The stator according to claim 2, wherein a span between the first insertion portion and the second insertion portion of one first conductor is equal to a pole pitch.

15. The stator according to claim 1, wherein the stator core has the plurality of winding slots formed at two end surfaces in the axial direction of the stator core.

16. The stator according to claim 1, wherein an extending direction of the plurality of winding slots is inclined relative to a radial direction of the stator core.

17. The stator according to claim 1, wherein:

a slot surface of each of the plurality of winding slots comprises a bottom wall surface and two side wall surfaces connected to the bottom wall surface, the two side surfaces being spaced apart from each other in the circumferential direction of the stator core, and the plurality of insertion portions being arranged between the two side wall surfaces;

each of the plurality of winding slots has a slot opening located at an end of the winding slot in the axial direction of the stator core, the slot opening being opposite to the bottom wall surface in the axial direction of the stator core; and a dimension of the slot opening in the circumferential direction of the stator core is smaller than or equal to a spacing between the two side wall surfaces in the circumferential direction of the stator core.

18. A motor, comprising the stator according to claim 1.

19. A manufacturing method of a stator, comprising:

providing a stator core, wherein the stator core has a plurality of winding slots, the plurality of winding slots being formed at an end surface of the stator core in an axial direction of the stator core and arranged at intervals in a circumferential direction of the stator core, each of the plurality of winding slots extending through an inner wall and an outer wall of the stator core; and pressing a coil unit formed by pre-assembling a plurality of first conductors into the plurality of winding slots in the axial direction of the stator core to insert an insertion portion of each of the plurality of first conductors into a corresponding one of the plurality of winding slots;

wherein:

one of the plurality of first conductors comprises a wire and an insulation layer wrapping around the wire;

an end of the insulation layer has a first opening, and the wire comprises a first pin extending out through the first opening;

the first opening has a first edge close to the outer wall and a second edge facing away from the outer wall, in an extending direction of the first pin, and a distance between the first edge and an end of the first pin is smaller than or equal to a distance between the second edge and the end of the first pin; and an angle between a plane where the first opening is located and a virtual plane ranges from 0° to 30°, the virtual plane being perpendicular to the extending direction of the first pin and passing through the second edge.

20. The manufacturing method according to claim 19, further comprising, prior to pressing the coil unit formed by pre-assembling the plurality of first conductors into the plurality of winding slots in the axial direction of the stator core to insert the insertion portion of each of the plurality of first conductors into the corresponding one of the plurality of winding slots:

providing a conductor of a linear shape, wherein the conductor comprises the wire and the insulation layer wrapping around the wire;

removing the insulation layer at two ends of the conductor; and bending the conductor to form the one of the plurality of first conductors, wherein the one of the plurality of first conductors comprises a plurality of insertion portions arranged at intervals.

21. A stator of a motor, the stator comprising:

a stator core having a plurality of winding slots, the plurality of winding slots being formed at an end surface of the stator core in an axial direction of the stator core and arranged at intervals in a circumferential direction of the stator core, each of the plurality of winding slots extending through an inner wall and an outer wall of the stator core; and a stator winding comprising a plurality of coil units stacked together in the axial direction of the stator core, each of the plurality of coil unit comprising a plurality of first conductors assembled together, each of the plurality of first conductors comprising at least one insertion portion inserted into a corresponding one of the plurality of winding slots, a first connection arm, and a second connection arm;

wherein:

each of the plurality of first conductors is provided with a first pin and a second pin at two ends of the first conductor, the first pin is connected to one of the two adjacent insertion portions by the first connection arm, and the second pin is connected to another one of the two insertion portions by the second connection arm;

in two adjacent coil units of the plurality of coil units, the first connection arm and the second connection arm of at least one first conductor of one of the two adjacent coil units are folded away from another one of the two adjacent coil units;

in two adjacent first conductors in the circumferential direction of the stator core, the second connection arm of one of the two adjacent first conductors passes between the second pin of another one of the two adjacent first conductors and the stator core;

a side of the second connection arm facing away from the stator core has an avoidance recess for avoiding the second pin of the other first conductor; and the second connection arm is bent where the second connection arm corresponds to the avoidance recess, and is formed as a protrusion protruding towards the stator core.

* * * * *